(12) United States Patent
De Foy et al.

(10) Patent No.: US 12,095,848 B2
(45) Date of Patent: Sep. 17, 2024

(54) TRANSPARENT RELOCATION OF MEC APPLICATION INSTANCES BETWEEN 5G DEVICES AND MEC HOSTS

(71) Applicant: INTERDIGITAL PATENT HOLDINGS, INC., Wilmington, DE (US)

(72) Inventors: Xavier De Foy, Kirkland (CA); Ulises Olvera-Hernandez, Montreal (CA); Debashish Purkayastha, Collegeville, PA (US); Shamim Rahman, Cote St. Luc (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/762,222

(22) PCT Filed: Sep. 25, 2020

(86) PCT No.: PCT/US2020/052862
§ 371 (c)(1),
(2) Date: Mar. 21, 2022

(87) PCT Pub. No.: WO2021/062256
PCT Pub. Date: Apr. 1, 2021

(65) Prior Publication Data
US 2022/0329648 A1    Oct. 13, 2022

Related U.S. Application Data

(60) Provisional application No. 62/905,878, filed on Sep. 25, 2019.

(51) Int. Cl.
*H04L 67/10* (2022.01)
*H04L 67/00* (2022.01)
*H04L 67/59* (2022.01)

(52) U.S. Cl.
CPC .............. *H04L 67/10* (2013.01); *H04L 67/34* (2013.01); *H04L 67/59* (2022.05)

(58) Field of Classification Search
CPC .......... H04L 67/10; H04L 67/34; H04L 67/59
See application file for complete search history.

(56) References Cited

U.S. PATENT DOCUMENTS 11,477,846 B2 * 10/2022 Fang ..................... H04W 80/02
2012/0002637 A1 * 1/2012 Adjakple .......... H04W 36/0058
455/436

(Continued)

FOREIGN PATENT DOCUMENTS

WO    2018/215046        11/2018
WO    2020150250 A1    7/2020

OTHER PUBLICATIONS

European Telecommunications Standards Institute, Multi-access Edge Computing (MEC); MEC Application Mobility, Draft ETSI GS MEC 0021 V2.0.8 (Apr. 2019).

(Continued)

*Primary Examiner* — Kostas J Katsikis
(74) *Attorney, Agent, or Firm* — VOLPE KOENIG

(57) ABSTRACT

Method, systems, and devices for transparent relocatable application instance deployment are described. A method performed by a Wireless Transmit/Receive Unit may comprise transmitting, to a Multi-access Edge Computing (MEC) system, a first message including a request to deploy the relocatable application instance at a target. The method may comprise receiving a second message including an indication to establish communication with the application instance and a Transparent Instance Relocation Session Identifier (TIRSI) and establishing, based on the second message, communication with the relocatable application instance at the target. The method may comprise transmitting a third message including a request for relocation of the (Continued)

application instance to another target. The method may comprise receiving a fourth message including an indication to establish communication with a relocated application instance at the another target and the TIRSI and establishing, based on the fourth message, communication with the relocated application instance at the another target.

20 Claims, 16 Drawing Sheets

(56) References Cited

U.S. PATENT DOCUMENTS

| | | | |
|---|---|---|---|
| 2018/0183855 | A1 | 6/2018 | Sabella et al. |
| 2018/0192471 | A1* | 7/2018 | Li .................. H04W 12/06 |
| 2019/0191341 | A1 | 6/2019 | Trang et al. |
| 2019/0220703 | A1* | 7/2019 | Prakash ............ G06V 10/95 |
| 2019/0357301 | A1* | 11/2019 | Li .................. H04W 80/10 |
| 2020/0351745 | A1* | 11/2020 | Alnås ............... H04W 36/00 |

OTHER PUBLICATIONS

European Telecommunications Standards Institute, Multi-access Edge Computing (MEC); Framework and Reference Architecture, ETSI GS MEC 003 V2.1.1 (Jan. 2019).
European Telecommunications Standards Institute, Multi-access Edge Computing (MEC); Mobile Edge Management; Part 2: Application lifecycle, rules and requirements management, ETSI GS MEC 010-2 V1.1.1 (Jul. 2017).
European Telecommunications Standards Institute, Multi-access Edge Computing (MEC); Mobile Edge Management; Part 2: Application lifecycle, rules and requirements management, ETSI GS MEC 010-2 V2.1.1 (Nov. 2019).
European Telecommunications Standards Institute, Multi-access Edge Computing (MEC); UE application interface, ETSI GS MEC 016 V2.1.1 (Apr. 2019).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
Interdigital, Inc., "New key issue on deployment consideration to enable seamless change of EC Application Server, serving UEs," 3GPP TSG SA WG2 Meeting #135, S2-1909925 (Oct. 14-18, 2019).
Kekki et al., "Mec in 5G Networks," ETSI White Paper No. 28 (Jun. 2018).
Purkayastha, "Terminal/UE as a MEC Platform," ETSI MEC(20)000042 (Feb. 2020).
Third Generation Partnership Project, "Technical Specification Group Services and System Aspects; System Architecture for the 5G System (5GS); Stage 2 (Release 16)," 3GPP TS 23.501 V16.2.0 (Sep. 2019).
Third Generation Partnership Project, "Technical Specification Group Services and System Aspects; System architecture for the 5G System (5GS); Stage 2 (Release 16)," 3GPP TS 23.501 V16.6.0 (Sep. 2020).
Third Generation Partnership Project, "Technical Specification Group Services and System Aspects; Procedures for the 5G System (5GS); Stage 2 (Release 16)," 3GPP TS 23.502 V16.2.0 (Sep. 2019).
Third Generation Partnership Project, "Technical Specification Group Services and System Aspects; Procedures for the 5G System (5GS); Stage 2 (Release 16)," 3GPP TS 23.502 V16.6.0 (Sep. 2020).
Third Generation Partnership Project, "Technical Specification Group Core Network and Terminals; 5G System; Network Exposure Function Northbound APIs; Stage 3 (Release 16)," 3GPP TS 29.522 V16.0.0 (Jun. 2019).
Third Generation Partnership Project, "Technical Specification Group Core Network and Terminals; 5G System; Network Exposure Function Northbound APIs; Stage 3 (Release 16)," 3GPP TS 29.522 V16.4.0 (Jun. 2020).

\* cited by examiner

TRANSPARENT RELOCATION OF MEC APPLICATION INSTANCES BETWEEN 5G DEVICES AND MEC HOSTS

CROSS-REFERENCE TO RELATED APPLICATIONS

This application is the U.S. National Stage, under 35 U.S.C. § 371, of International Application No. PCT/US2020/052862 filed Sep. 25, 2020, which claims the benefit of U.S. Provisional Application No. 62/905,878, filed Sep. 25, 2019, the contents of which are incorporated herein by reference.

BACKGROUND

As new use cases come into existence, there may be a need for systems, methods, and devices to address the wireless communication issues that may arise. For example, new use cases may involve highly mobile devices that may need to maintain wireless connectivity due to demands of the applications being used by a user of the mobile devices. This will require improvements of existing techniques or novel approaches to wireless communication management.

Today, for instance, Multi-Access Edge Computing (MEC) applications may be hosted in the network, on servers that may be collocated with network infrastructure nodes. There may be a need for support in order for MEC applications to be run on a Wireless Transmit/Receive Unit (WTRU) and transferred to and from the WTRU. Such support would enable lowering latency and improving privacy, in some cases. Solutions may be needed for deploying MEC application instances on a WTRU or MEC host, while enabling relocation of instance between WTRUs and/or MEC hosts. Transparent relocation between WTRUs/MEC hosts without application support, by maintaining the IP address, may also be desirable.

SUMMARY

Method, systems, and devices for transparent relocatable application instance deployment are described. A method performed by a Wireless Transmit/Receive Unit may comprise transmitting, to a Multi-access Edge Computing (MEC) system, a first message including a request to deploy the relocatable application instance at a target. The method may comprise receiving a second message including an indication to establish communication with the application instance and a Transparent Instance Relocation Session Identifier (TIRSI) and establishing, based on the second message, communication with the relocatable application instance at the target. The method may comprise transmitting a third message including a request for relocation of the application instance to another target. The method may comprise receiving a fourth message including an indication to establish communication with a relocated application instance at the another target and the TIRSI and establishing, based on the fourth message, communication with the relocated application instance at the another target.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
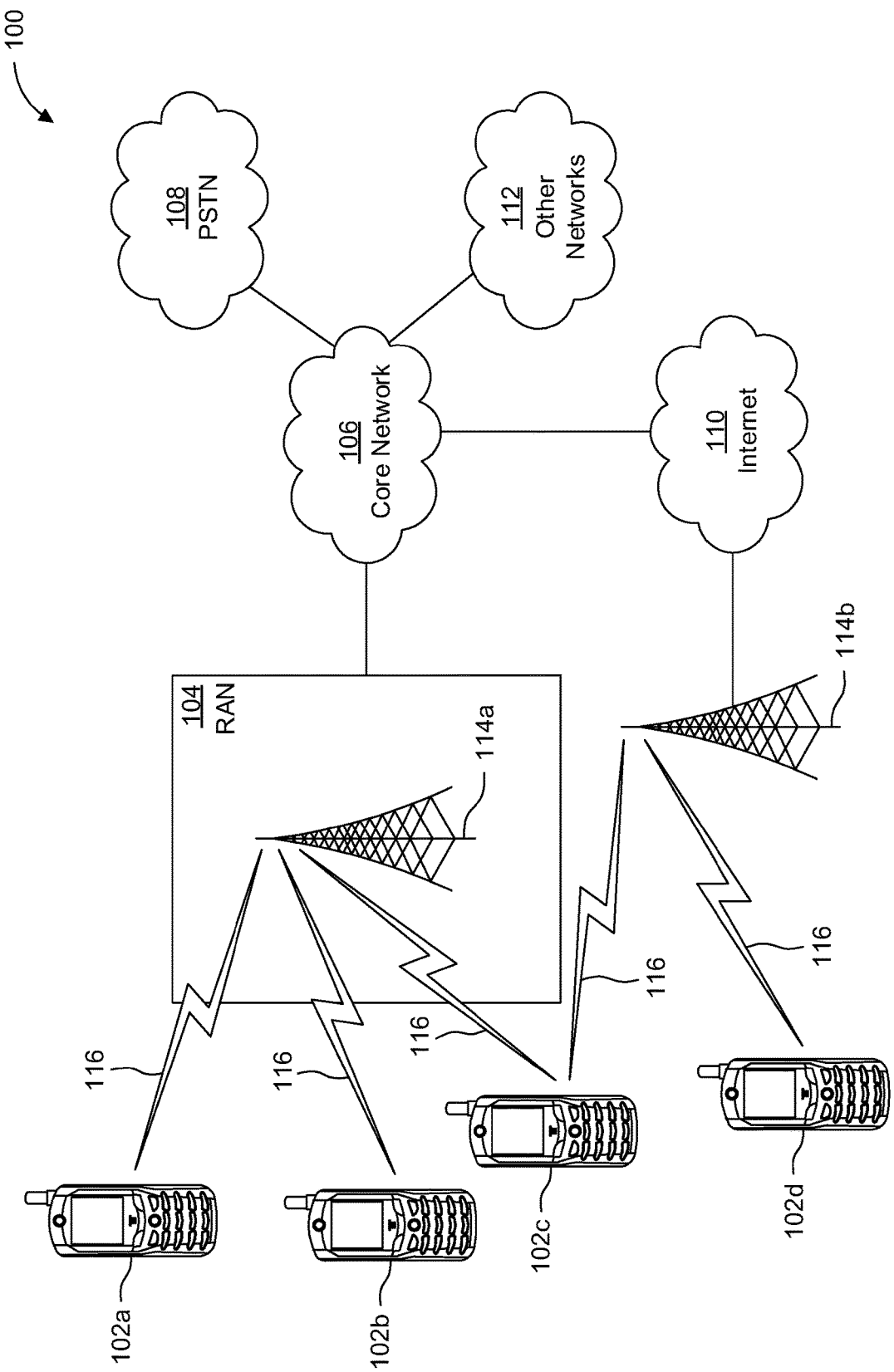
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
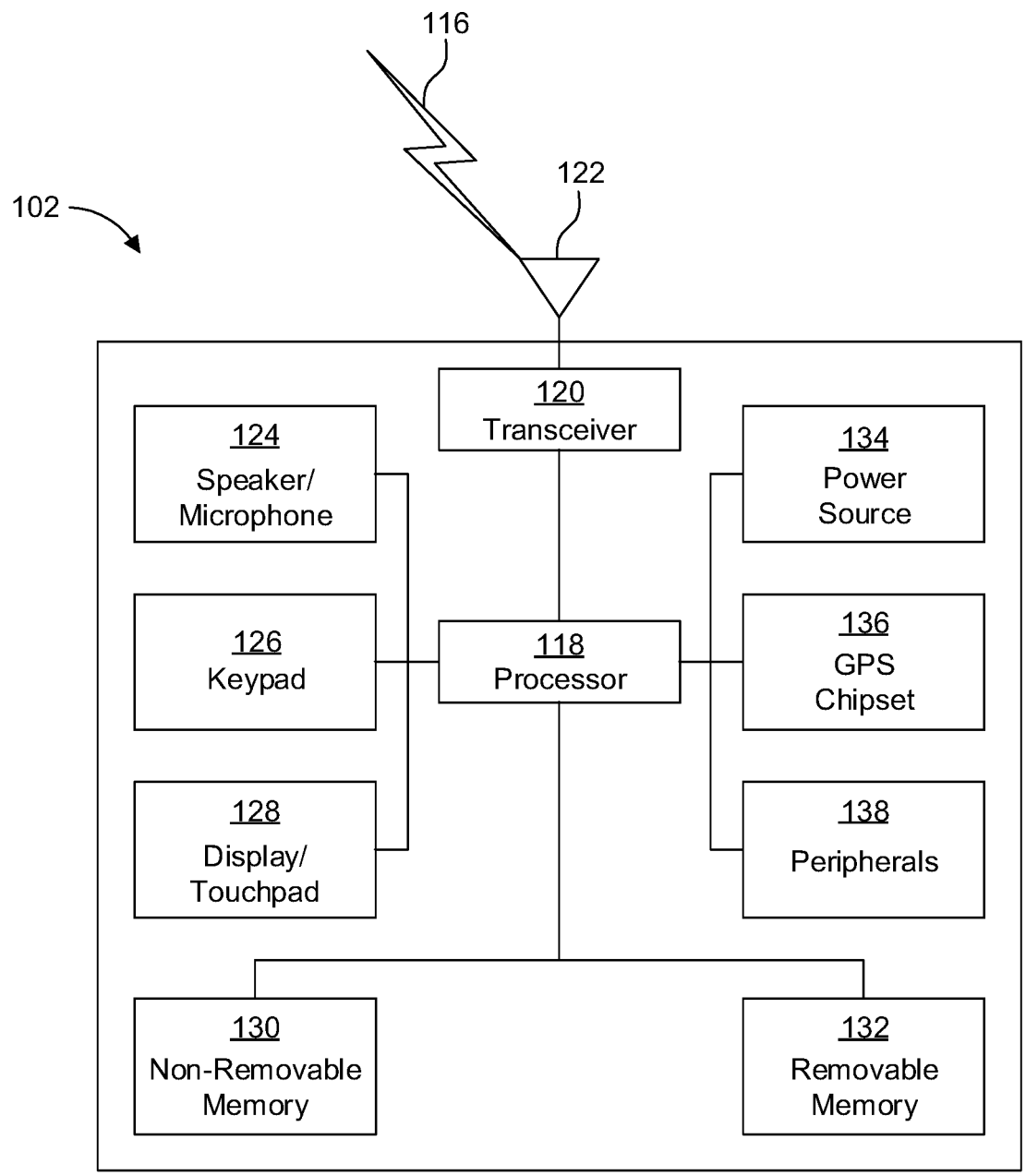
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
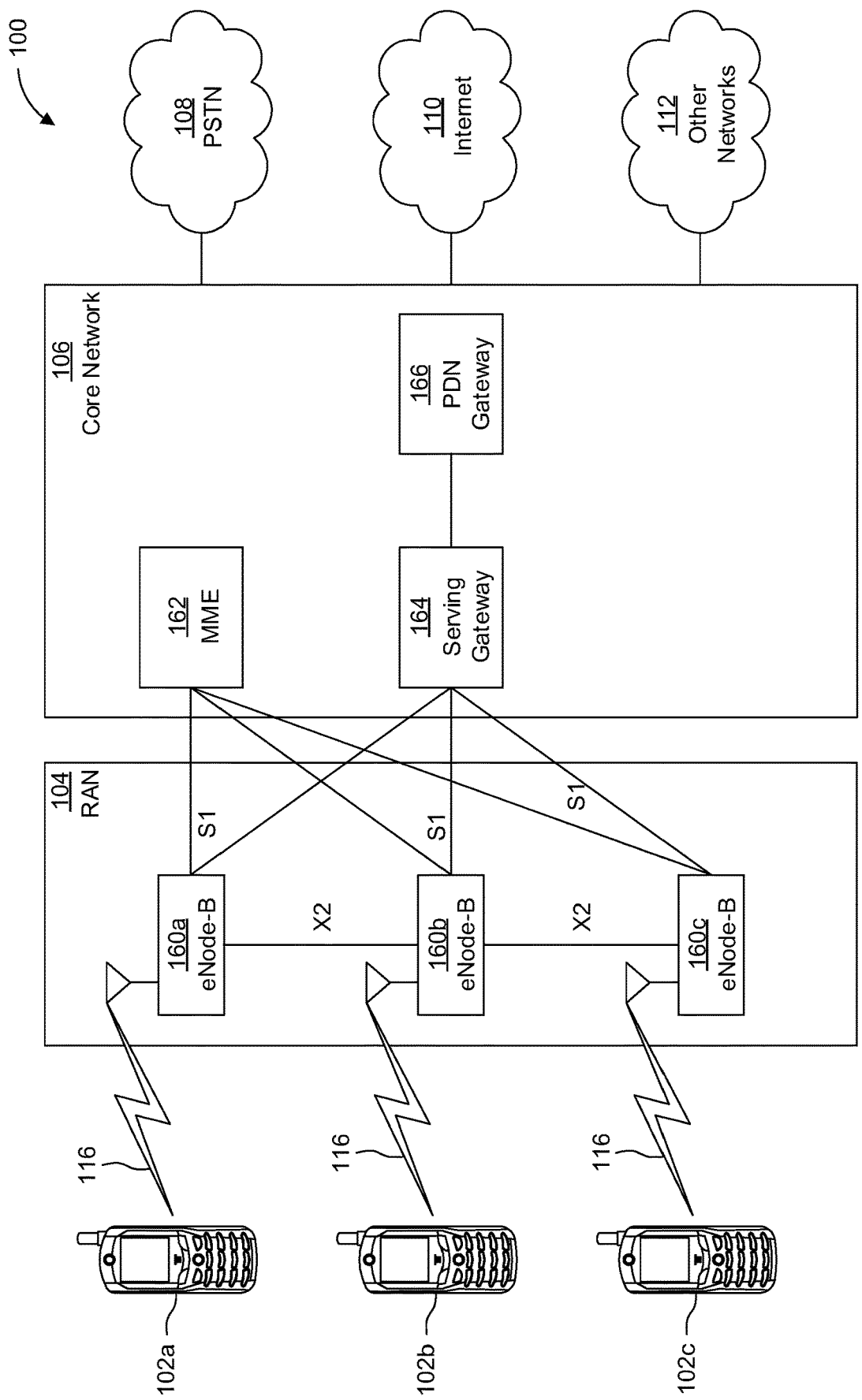
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
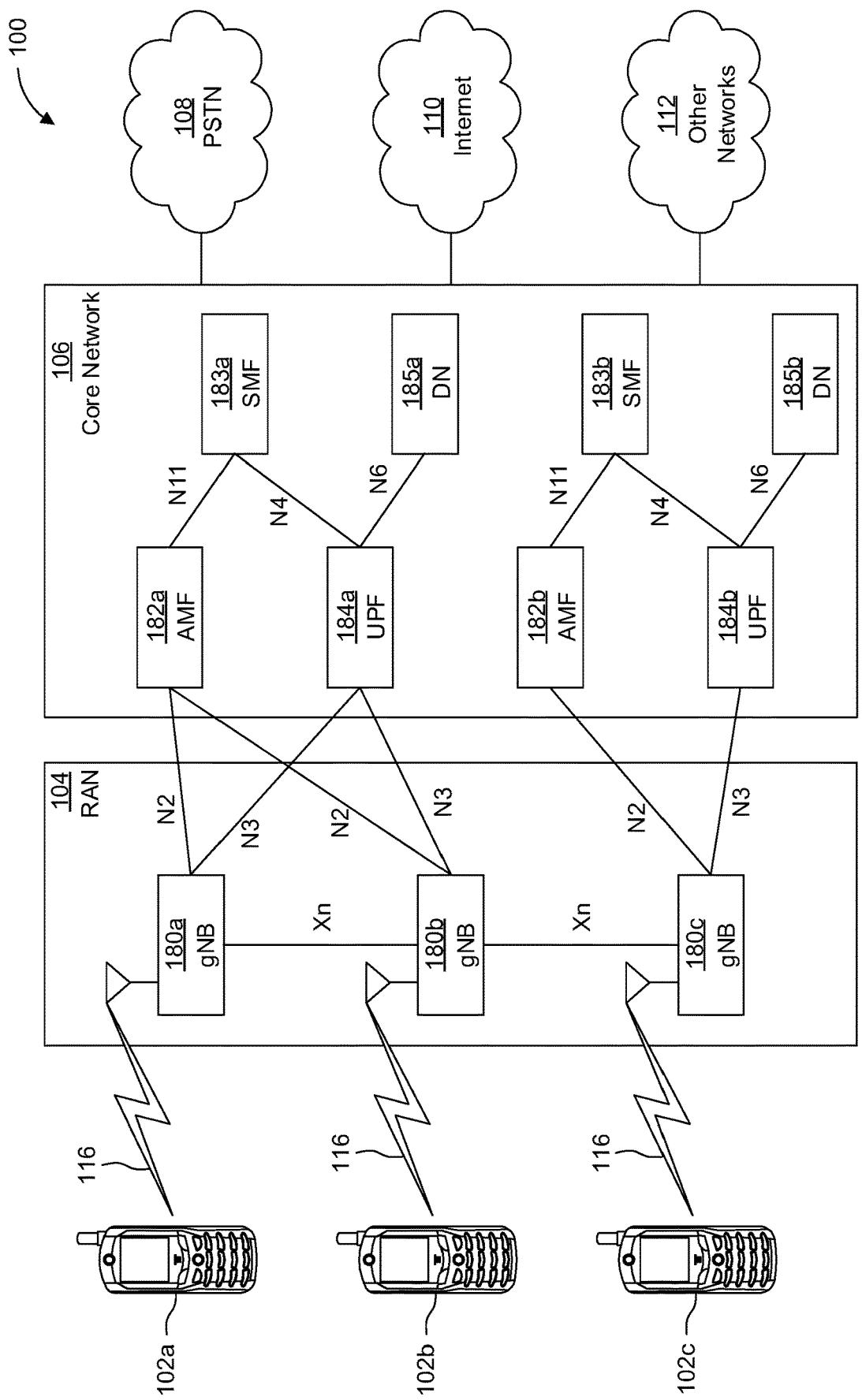
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A Multi-access Edge Computing (MEC) system may enable networked applications to be run at the edge of a network, and may be integrated with other systems, such as those using 5G technologies.

A MEC application is a software application, such as a program, virtual machine (VM), application container, unikernel, or the like; as discussed herein, all of these examples may be interchangeably referred to as an "application." An MEC application may be deployed in a MEC system and may be run on MEC hosts or, as discussed herein, on WTRUs (e.g., UEs) as well. A MEC application may be a terminating application (i.e., it terminates an IP connection with a client application on a WTRU) or a pass-through application (i.e., it processes application traffic flows passing through a MEC host). A client application running on the WTRU, such as a browser or a native application client, may terminate the application traffic. Other application components may exist as well (e.g., in a public cloud).

An example application flow, generally, may connect the following components: a first segment between a client application instance and a MEC application instance; and a second segment between a MEC application instance and a cloud application instance. Other flows may exist, such as a flow between the client and the cloud may be used for login and privacy-sensitive operations. In some cases, no cloud instance is present and the application traffic may be entirely between a WTRU and MEC application instance.

An "application context" may be a set of information elements maintained by the MEC system that describes an edge application running on the MEC system. A WTRU may request from the MEC system (e.g., over a Mx2 interface) the creation or removal of an application context, which may result in respectively creating or shutting down an application instance on a MEC host. The application context may be associated with an application context ID (e.g., generated by the MEC system). The Mx2 interface may be transported over a user plane connection (e.g., a PDU session).

Application relocation may relate to the ability to transfer, or relocate, an application instance from a MEC host to another MEC host (e.g., to bring this instance closer to a WTRU after relocation of a gNodeB). Application relocation may be transparent, meaning not visible by the application, or application assisted, meaning the redirection and/or application state transfer may be supported by the MEC application itself.

When transparently relocating a MEC connection-terminating application instance, the application may not be aware of the instance relocation (e.g., the IP address of the instance may be maintained across relocation).

When the application is able to assist in MEC application instance relocation, the IP address of the MEC application instance may not need to be maintained across relocations. Some application-assisted mobility mechanisms may be known within a system. For example, an application state may be exchanged between instances at the application layer, and the WTRU application client may be redirected towards the new MEC application instance (e.g. using HTTP redirect, SIP re-invite, or another application-layer mechanism).

When relocating pass-through applications, the application instance may be inserted in the application flow using traffic forwarding rules or using a chaining mechanism such as SFC.

The term "application state" as disclosed herein may designate the state information of an application instance, which may be needed to migrate (e.g., re-create) an application instance on another visualization platform (e.g., another MEC host or WTRU). For example, this state may include serialized session data (e.g., in the case where the application supports serializing/deserializing session data to support application migration explicitly), or it may be a set of serialized memory, files and/or application image that can be used to migrate a virtual machine (VM) or application container.

It may be necessary to provide support for MEC application instance relocation from a MEC host to another MEC host, as well as a MEC application relocation between a WTRU and a MEC host, or between two WTRUs. This need may be addressed through methods, systems, and devices as disclosed herein, which may enable a number of use cases.

An example use case may be where a WTRU runs locally on the WTRU an application including a computation-heavy component for video rendering. To save battery power, the WTRU may determine to offload this component to a new target host in the MEC infrastructure integrated with the 5G system.

An example use case may be where a WTRU moves to an area with no local MEC coverage and the communication latency with an already offloaded component running on a host part of the MEC infrastructure becomes too large. The WTRU may determine to request that the offloaded component be transferred back on the WTRU (i.e., the WTRU may become the new target host for this component).

An example use case may be where, in a game involving communication between two WTRUs, a first WTRU decides to offload a game software component onto the second WTRU (i.e. the second WTRU may be the target host for this offload). The decision may be made, for example, because the second WTRU may have more processing power and is AC-connected) The first WTRU may then communicate with this offloaded component over a device-to-device (D2D) link or through the regular 5G network.

An example use case may be where a WTRU locally runs a machine learning MEC application instance that collects and processes data locally (e.g., to preserve the end user's privacy and/or data ownership). To save battery power, the WTRU may decide to offload such a component to a new in-network target host managed by a trusted MEC network integrated with the 5G system. When moving into an area where MEC infrastructure is provided by another MEC operator, the WTRU may decide to relocate back the application instance on the WTRU, (e.g., because the end user does not have a sufficient trust relationship, or requisite permissions, with or at the new MEC network operator).

An example use case may be where a WTRU moves into an area where multiple MEC sites (e.g., identified by multiple data network access identifiers (DNAIs)) are available. Each site may be associated with different trust/security levels, cost, and the like. The WTRU may discover these site IDs/DNAIs and associated characteristics using a discovery protocol (e.g., an application). The WTRU may then decide to use one MEC site or another, using their characteristics with regards to the requirements of the end user and client applications. For example, streaming applications may make use of the lowest cost MEC site available, while applications handling sensitive data may make use of an MEC site associated with a trust level above a minimal threshold.

Figure 2:
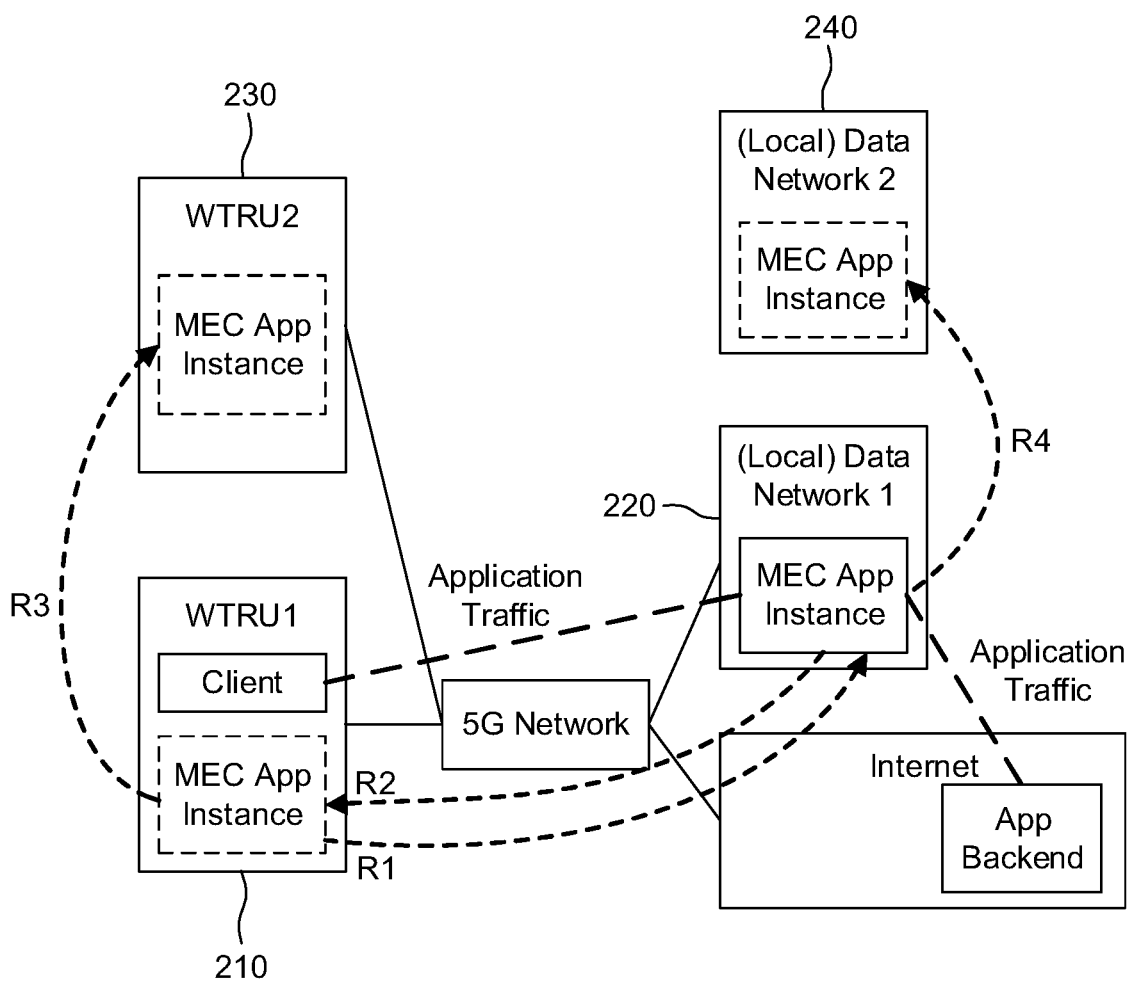
FIG. 2 is a diagram illustrating an example of an Multi-access Edge Computing (MEC) application instance relocation.

FIG. 2 is a diagram illustrating several example cases of MEC application instance relocation (e.g., from an initial host to a target host). In a first relocation case (R1), a component on a WTRU 210 may send a request to an MEC platform to relocate (i.e., offload) an MEC application instance currently running on the WTRU to a target host part of the MEC platform, which may be located in a local area data network 220. In some cases, a network element (e.g., an orchestrator) may initiate this relocation. The network element may alternatively notify the WTRU 210, which may then decide to request or not request a relocation. Complex logic may be involved in making the decision, and may be implemented on the WTRU 210 and/or in the orchestrator. For example, a WTRU may request an MEC application instance to run locally on the WTRU while the WTRU is moving above a given speed, as offloading could result in wasteful usage of network resources to relocate the MEC application instance from attachment point to attachment point. Then, after the WTRU has stopped moving for some time, offloading may be requested to save battery power. The level of trust, or the permissions that the WTRU or user has with or at an MEC network operator may also influence a decision to relocate a MEC application instance between the WTRU and the MEC infrastructure.

In a second relocation case (R2), the WTRU 210 and/or the network may initiate an application relocation from a MEC server, which may be located in a local area data network 220, to a WTRU. The target WTRU may be the WTRU 210 running the client application, another WTRU connected to the client WTRU over a D2D link such as the PC5 interface used for V2X, or another WTRU 230 connected to the client WTRU through the 5G network. Complex logic may be used as in the above case: for example, a WTRU deployed in a vehicle may request relocating a MEC application instance on the WTRU preemptively when the vehicle starts moving, to avoid service slowdowns or disruptions, or when charging the WTRU, to benefit from a lower latency without negatively impacting battery charge. A WTRU deployed on a drone may request a MEC application instance, such as part of a collision avoidance or navigation application, to be relocated in or out of the WTRU depending on the availability of MEC hosts in the area, network conditions, or the like.

In a third relocation case (R3), the WTRU 210 and/or the network 215 may initiate an application relocation from a WTRU to another WTRU. Here also the target WTRU may be the WTRU 210 running the client application or another WTRU. Complex logic may be used, for example to opportunistically use nearby WTRUs that are currently charging or have high battery power.

In a fourth relocation case (R4): the WTRU 210 and/or the network 215 may initiate an application relocation from a MEC server to another MEC server, for example to continue providing a low-latency service when the WTRU changes its attachment point. As shown in FIG. 2, one MEC server may be located in a first local area data network 220, while the second MEC server may be located in a second local area data network 240.

In an example deployment, a set-top box deployed in a home and registered as a WTRU with a 5GS may be used as an MEC host and enable residents to offload tasks from their mobile phones and tablets, for example, to save battery, using the mechanisms described herein.

In one or more embodiments disclosed herein, there may be devices, systems, and procedures to enable MEC application instance relocation between WTRUs and/or MEC hosts. Embodiments described herein may support both transparent and non-transparent (e.g., application-assisted) relocation of connection-terminating MEC application instances and may also support relocation of pass-through MEC application instances. These one or more embodiments may address some of the issues arising from examples in FIG. 2.

Regarding cases R1, R2, and R3 for FIG. 2, a first key issue may define a need for an approach that enables, in an integrated 5G-MEC system, an MEC application instance to be relocated between a WTRU and a MEC host, or two WTRUs (e.g., an approach to request a MEC application instance relocation to/from a WTRU; e.g. an approach to have a 5G system direct application traffic towards an MEC application instance on a WTRU). It may be advantageous that both terminating and pass-through applications are relocatable.

Regarding cases R1, R2, R3, and R4 in FIG. 2, a second key issues may define a need for an approach that enables, in an integrated 5G-MEC system, an MEC application instance to be transparently relocated (e.g., without breaking the application session and without support from the application itself). For example, transferring only the instance IP address from one MEC host or WTRU to another may not be sufficient: traffic rules should be updated in 5GS to enable application traffic to reach the new location of the relocated MEC application instance.

In order to address the first key issue, a WTRU-hosted MEC platform and related MEC signaling that enables triggering of application relocation between a WTRU and an MEC host may be used. Further, there may be standardized way of requesting an MEC application instance relocation to/from a WTRU, in which an application relocation request message over Mx2 and enhanced application context create message over Mx2, are used. Further, there may be an approach to direct application traffic in 5GS towards an MEC application instance on a WTRU, where a virtual DN and virtual UPF on the WTRU may be used.

In order to address the second key issue, a Transparent Instance Relocation Session ID (TIRSI) information element may be used to enable managing session continuity when relocating. This may be accomplished through one or more ways. In Approach A, an MEC application instance relocation may be controlled through the NEF. Another approach, Approach B, may be based on enhancing PDU session handling and having MEC hosts register with the 5G system as WTRUs. Both Approaches A and B may be used, possibly concurrently, or aspects of both approaches may be used in combination. For example Approach A may be used for fixed MEC hosts and Approach B may be used for mobile MEC hosts, such as those embedded in a vehicle. For example, a TIRSI may be used to retrieve pre-relocation information such as SMF ID, traffic forwarding rules, D2D link or PDU session context.

Further aspects of Approach A are described herein. An MEC system (e.g., an orchestrator or platform) may influence user plane traffic forwarding through an NEF using a traffic influence API enhanced to carry information elements (IEs) such as a target ID and/or TIRSI. An MEC system may allocate an IP address to an MEC application instance for the purpose of communicating with the client application on the WTRU. The MEC system may set up the initial MEC application instance and use an NEF API to direct client WTRU traffic towards the instance. The MEC system may relocate the instance and use NEF API to redirect client WTRU traffic towards the new instance.

Further aspects of Approach B are described herein. The MEC host may be registered as a 5G device, and may request a PDU session from the 5G system (e.g., through a non-3GPP interworking function (N3IWF) gateway or directly without a gateway if the MEC host is in a trusted environment). The MEC host in this case may obtain an IP address for the PDU session from an SMF. This may enable application instances running on WTRUs and MEC hosts to have their connectivity managed in a consistent way by an SMF, enabling 5G-managed relocation of application instances between WTRUs and MEC hosts. Procedures may be enhanced. For example, to carry a TIRSI in messages and use a TIRSI at an AMF and/or SMF to enable transparent MEC application instance relocation. Procedures may be enhanced, for instance, to carry N4 messages, and/or N4 messages adapted to in-WTRU UPF, over N1 to enable MEC application instances on a WTRU.

Maintaining the IP address of the MEC application instance may result in this IP address being reachable only by the client application on the WTRU. This may be acceptable in the context of edge computing, where the focus is to maintain the IP session for the client. The MEC application instance may, for example, use another source IP address to communicate with other endpoints outside of a 5G network, such as cloud servers. The MEC application instance may not require those other IP sessions to be transparently maintained upon relocation or may use IP mobility mechanisms (e.g., MIP or PMIP) to achieve this goal.

Figure 3:
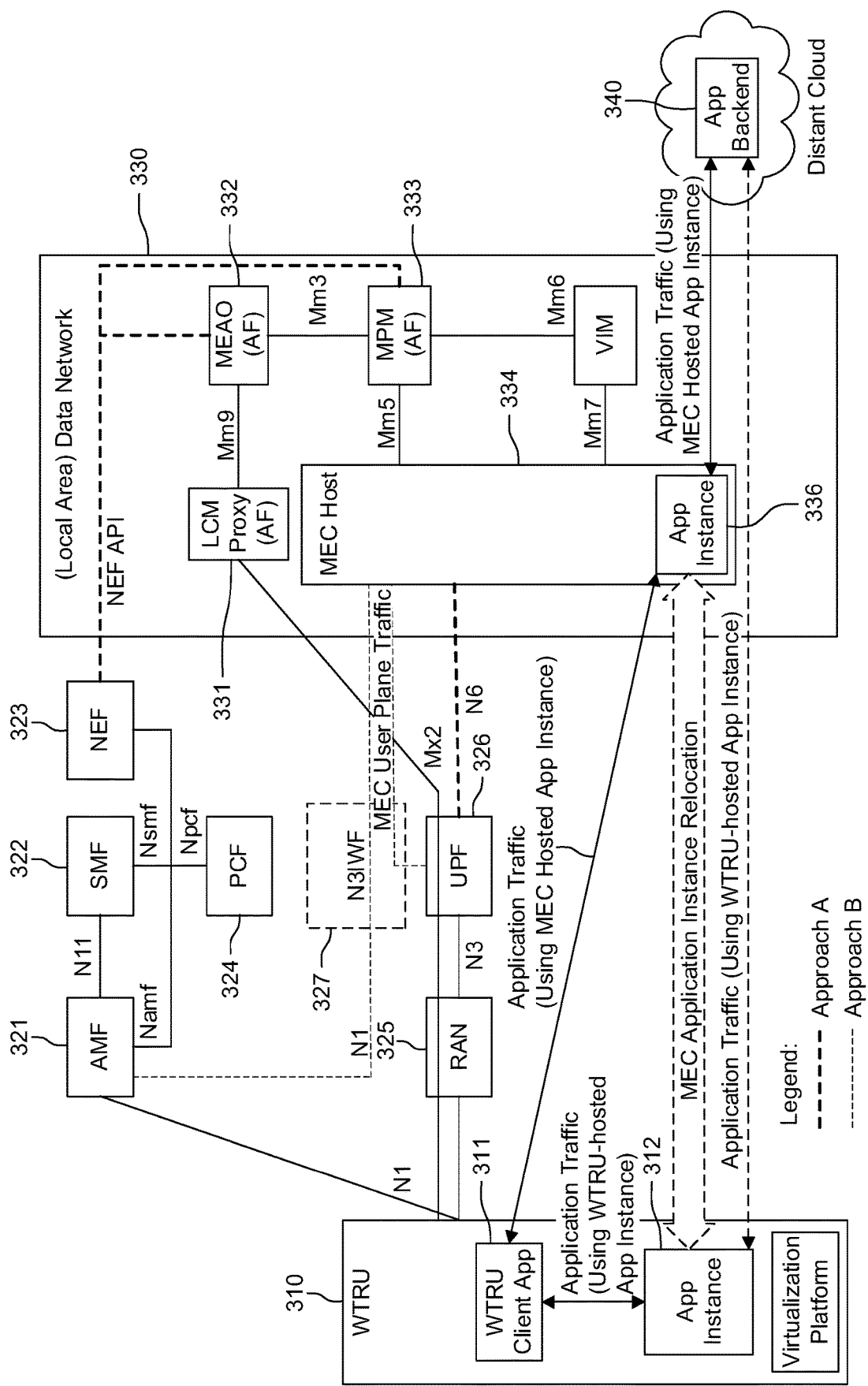
FIG. 3 is a diagram illustrating an example of an application context transfer architecture.

FIG. 3 is a diagram illustrating an example of an application context transfer architecture. This example shows a MEC system integrated with a 5G system. The example also includes interfaces and components for implementing relocation of MEC applications between WTRUs and/or MEC hosts, as discussed herein.

As shown in FIG. 3, a 5G system may include at least one WTRU 310 as well as one or more functions and interfaces, such as an Access and Mobility Management Function (AMF) 321, a Session Management Function (SMF) 322, a Network Exposure Function (NEF) 323, a Policy Control Function (PCF) 324, a Radio Access Network (RAN) 325, a User Plane Function (UPF) 326, a Non-3GPP Inter Working Function (N3IWF) 327 and reference points N1, N3, N6, N11, Namf, Nsmf. A PDU session anchor (PSA) UPF may connect the 5G system to a data network (DN) or local area data network (LADN) 330 where a MEC system is deployed.

Generally, there may be one or more functions and one or more interfaces of a MEC system, such as a Life Cycle Management proxy (LCM) 331, an MEC Application Orchestrator (MEAO) 332, an MEC Platform Manager (MPM) 333, a Virtualization Manager (VIM) 335, an MEC Host 334, a client application 311 on the WTRU 310, an MEC application instance 336 on the MEC host, and reference points Mx2, Mm9, Mm3, Mm6, Mm5, Mm7.

An application backend 340, such as one running on a public cloud server instance, may be present in some use cases. An LCM Proxy, MEAO, and/or MPM may be integrated with 5G as application functions (AF).

Figure 4:
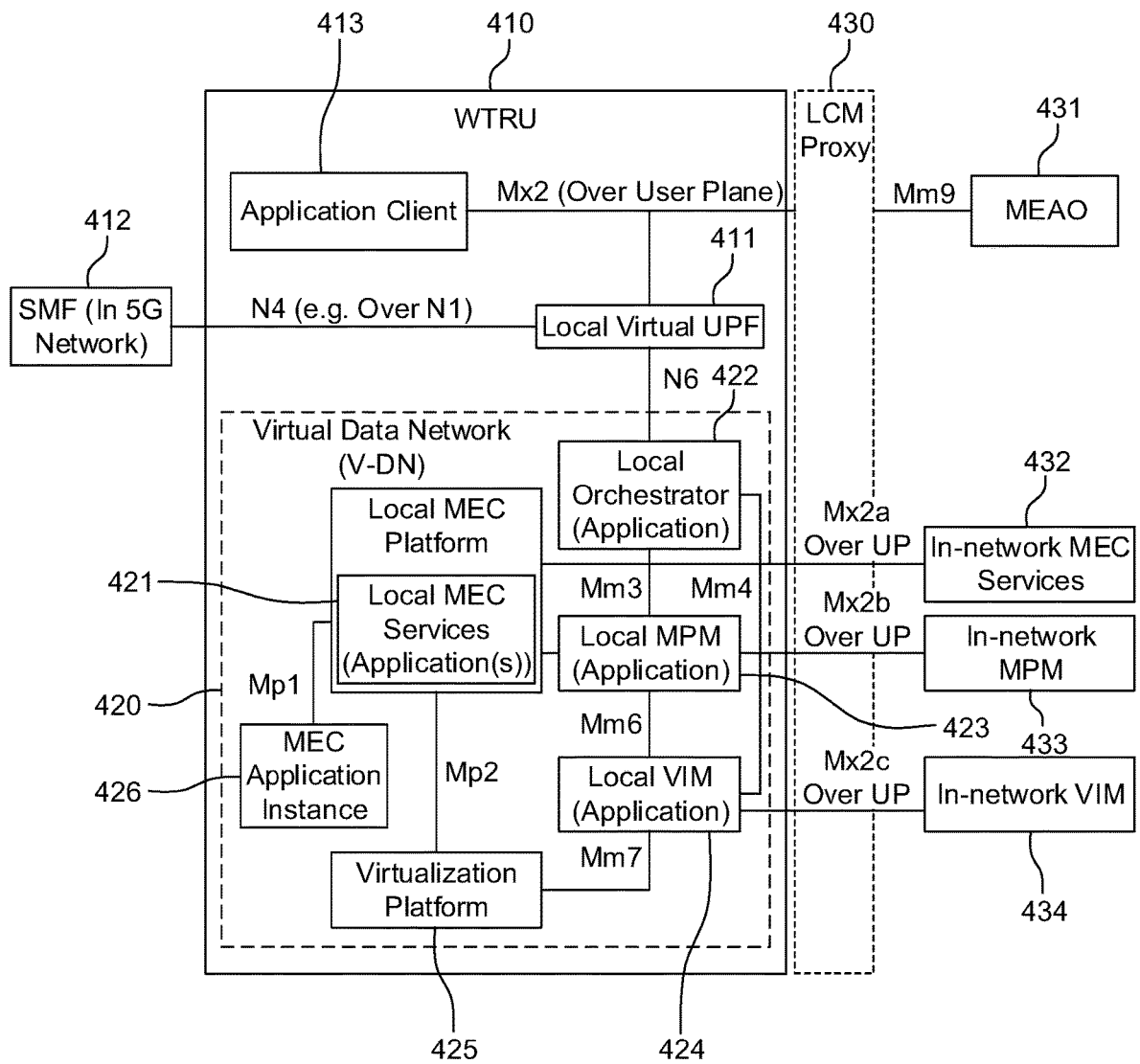
FIG. 4 is a diagram illustrating an example of internal WTRU architecture for an On-WTRU MEC.

A MEC application instance 312 may also run on the WTRU 310, over an internal virtual infrastructure, which may be described in FIG. 4. The MEC application client or a local orchestrator component may communicate over Mx2 (e.g., to request the deployment or relocation of a MEC application instance).

In Approach A, user plane traffic between MEC host and anchor UPF may be routed over the N6 interface. The MEC system may request the steering of traffic from a WTRU towards an MEC application instance, using a NEF API which may be a "traffic influence" API. The NEF API may be used in one or more scenarios.

In some scenarios, an NEF API may be used in cases where the MEC application instance is running on the WTRU: a traffic influence API may in this case indicate that the target host for the MEC application instance is a WTRU (e.g., with a target WTRU ID). In cases such as this, the network and/or WTRUs may be configured for user plane traffic between a client application and MEC application instance to be over a local loopback interface on the WTRU, or over a D2D link.

In some scenarios, an NEF API may be used in cases where the MEC application instance is transparently transferred between WTRU/MEC hosts. In cases such as this, an MEC system may need to communicate to the NEF that the request to influence traffic is not an original request, but a relocation request (e.g., by including a TIRSI that was already used before). 5GS may therefore update existing forwarding rules to direct traffic to/from the new MEC application instance, and possibly forward in-flight packets.

In Approach B, the MEC host itself, acting as a 5G device, may request the establishment of a connection for a given MEC application instance. A PDU session may be established over an N1 interface through a N3IWF gateway or directly over the N1 interface if the MEC application instance is on a WTRU attached to a RAN (e.g., a mobile phone). For example, the N3IWF gateway and PSA UPF used for the PDU session may be collocated with an MEC host. A given PDU session may be used to communicate user plane traffic with one or more client applications on one or more WTRUs. MEC host may be authenticated with 5GC (e.g., using a SIM card associated with a subscription). User plane traffic sent through N3IWF may be encrypted from the MEC host to N3IWF (e.g., as per N3IWF operation); alternatively, if the local area data network is trusted by the MEC system operator, or if they are the same entity, user plane traffic may not use such encryption.

FIG. 4 illustrates the inner working of a WTRU 410 enabling the deployment of an MEC application instance on the WTRU. The local services 421, orchestrator 422, MPM 423, and/or VIM 424 may be applications running in a user space. A virtualization platform 425, such as supporting Virtual Machines or software containers, may be present on the WTRU 410 to enable MEC applications instances 426 to run seamlessly on heterogeneous WTRU hardware. For example, an existing hypervisor type 1 (native) or type 2 (hosted) may be used as a virtualization platform. Alternatively, an operating system-level virtualization platform may be used to run application containers instead of virtual machines.

An MEC infrastructure may be located on the WTRU 410, for example deployed in an isolated execution environment, and may be interconnected with a MEC system in the network. The local MEC infrastructure may form a Virtual Data Network (V-DN) 420 on the WTRU 410. This V-DN 420 may be associated with a data network name (DNN). A local virtual UPF component 411 present on the WTRU may be configured by the SMF 412 to provide access to the local V-DN 420. When a PDU session establishment takes place with DNN set to the name of the local V-DN 420, an SMF 412 in 5GC may control the local virtual UPF 411, which makes it possible to apply operator and user policy using the usual 5G framework. During such a PDU session establishment, no RAN resource reservation may take place, and the virtual UPF 411 may configure traffic forwarding rules on the WTRU 410 to ensure that user traffic is forwarded over the loopback interface between the client application and the MEC application instance 426.

Figure 7:
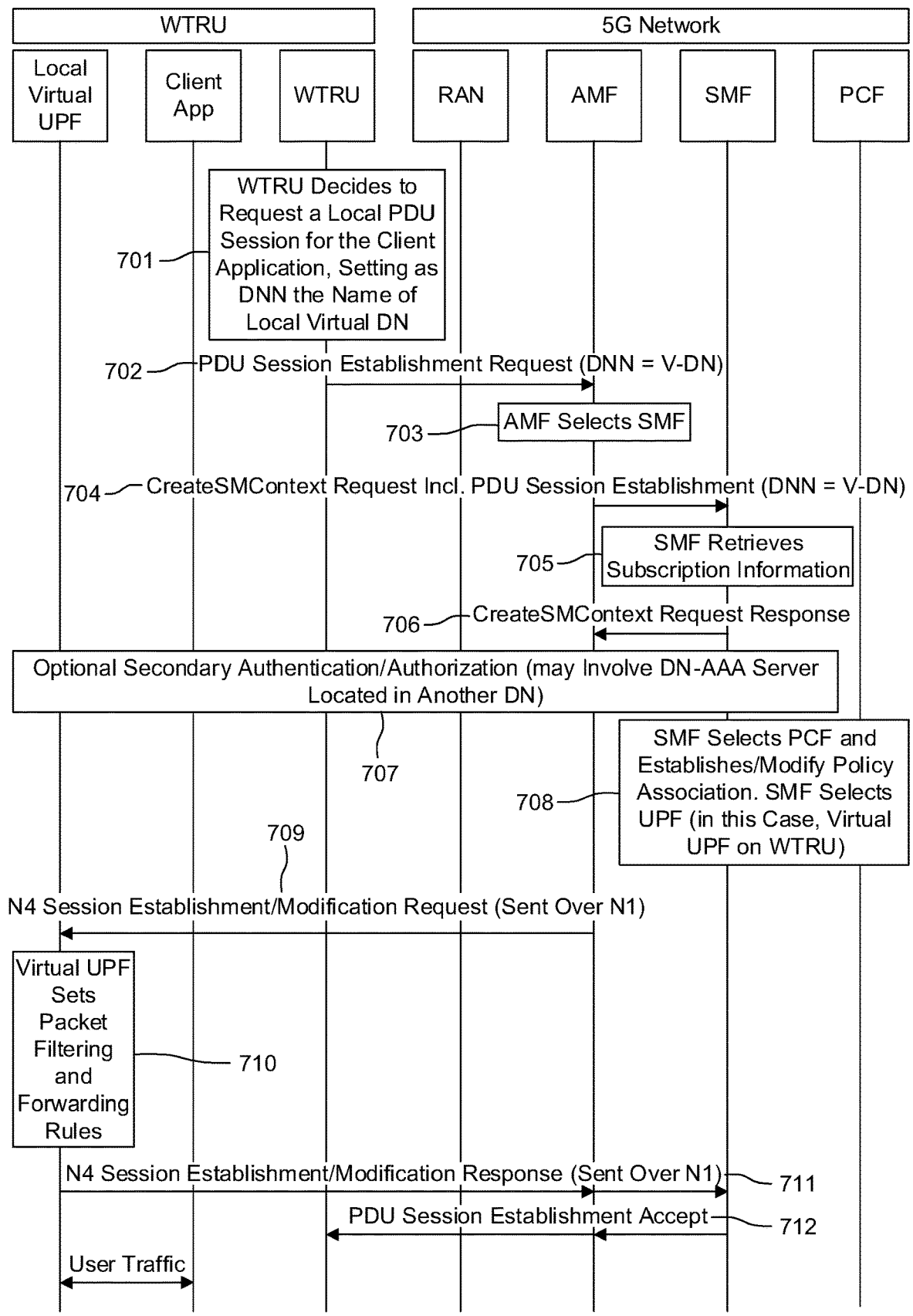
FIG. 7 is a procedure diagram illustrating an example of PDU session establishment to a Virtual Data Network (V-DN).

FIG. 7, described substantially in paragraphs below also provides an example of PDU session establishment to a V-DN. In some cases, such as when the WTRU lost network connectivity, the WTRU may be allowed by local operator policy to locally control the local virtual UPF, as further discussed below. A V-DN may be deployed in an isolated environment (e.g., in one or more virtual machines or software containers on the WTRU), which may be under the control of an MEC system operator.

Further details of a Virtual UPF are provided herein. A Virtual UPF may also control traffic forwarding rules over a D2D link, therefore enabling setting up a connection between a client application on the WTRU and an MEC application instance on another WTRU. A Virtual UPF may be a simplified and/or specialized version of an actual in-network UPF (i.e., it may include code controlling the specific forwarding rules technology of a particular type of WTRU, such as iptables on Linux); for example, it may omit some of the functionalities of an in-network UPF, such as the branching UPF functionality, which may not be needed on a virtual UPF. A Virtual UPF may exchange N4 messages with SMF, or restricted/simplified/modified versions of N4 messages, such as QoS specifications may be simplified or omitted when related to a loopback connection.

A Virtual UPF may be under the control of an SMF, under the control of a local component on the WTRU, or both. Control by the SMF may mean that local and D2D connections to MEC application instances may be handled as PDU sessions, and that a 5GS may use the existing mechanisms for applying policy and charging. This may be possible when the WTRU is connected to the network. For usage of the MEC infrastructure on the WTRU or nearby WTRUs while the WTRU is not connected to a 5GS, a local component on the WTRU (e.g., a local orchestrator) may directly control the virtual UPF, possibly using a local operator policy configured on the WTRU.

As is also shown in the context of FIG. 4, local MEC components (e.g., services, orchestrator/MEAO, MPM, VIM) may provide a local function corresponding to the services, orchestrator/MEAO 422, MPM 423, and VIM 424 defined in the MEC architecture; they may also act as a proxy for in-network orchestrator 431, in-network MEC services 432, in-network MPM 433, or in-network VIM components 434. The Local orchestrator 422 and application clients may send messages, such as life-cycle related messages, over the Mx2 interface towards the LCM proxy 430. The LCM proxy 430 may relay these messages to the orchestrator over Mm9. Interfaces Mx2a, Mx2b and Mx2c may be encapsulation of Mp1, Mm5, Mm7 respectively over the Mx2 interface. These interfaces may directly interconnect in-network and local components, or they may pass through the LCM 430 or another proxy function.

In an example that may be explained with reference to FIG. 4, the local orchestrator 422 may determine an application instance should be transferred on the WTRU or offloaded to the MEC system, based on battery usage and network performance. In an example, an in-network VIM 434 may communicate Mm7 messages such as virtual storage or compute allocation to the local VIM component 424 on the WTRU 410 over an Mx2c interface. In an example, the in-network MPM 433 may communicate Mm5 messages for example, to start or stop an application instance on the local MPM component on the WTRU over an Mx2b interface. In an example, a MEC application instance on the WTRU may invoke local MEC service "A" using a function call and may invoke in-network MEC service "B" over an Mx2a interface (i.e., in this example Mp1 interface may be local to the WTRU for service "A" and may be transported over an Mx2a interface for another service "B"). As disclosed herein, there may be no assumptions made on the in-network or on-WTRU location of the MEC platform, VIM, MPM and MEC services functionalities.

As disclosed herein, whether the MEC application instance relocation is transparent or not, 5GS may need to change forwarding rules in the network and in the WTRU, to ensure that traffic from the client application is forwarded to the second MEC application instance. 5GS may also forward in-flight traffic, such as from the old PSA UPF to the new PSA UPF, to ensure that no packets are lost during the relocation procedure. To facilitate this process, a transparent instance relocation session ID (TIRSI) may be used that can be used by 5GS nodes to retrieve context information related to the first MEC application instance, during a relocation procedure.

Further details regarding the TIRSI are described herein. In some embodiments, TIRSI may be an ID defined in its own namespace (e.g. a numerical value, URI, or other value), unique within 5GS. For example, it may be generated by the MEC system in a subset of the namespace owned by the MEC system operator (e.g., tirsi:mec-operator.com/1234). In some embodiments, TIRSI may be derived from the IP address of the MEC application instance or its MAC address if this is a layer-2 service, and this may be suitable for cases where the IP address is maintained during relocation (e.g., transparent relocation). In some embodiments, TIRSI may be derived from a PDU session ID used in 5GS, where in such a case, the MEC system may not generate it, and may instead receive it from 5GS (e.g., in a response message from 5GS). Also, in this case a "group-scoped" PDU session ID may be used in 5GS (i.e., a PDU session that is unique within a given scope (e.g., a DNN, 5GLAN group, etc.)). In some embodiments, a TIRSI value may be split into two values (e.g., a group and an ID unique within this group). For example, the group may be a domain name, 5GLAN group ID, DNN, slice ID (e.g., NSSAI) or other 5G group ID.

FIGS. 5A, 5B, 5C, and FIG. 5D illustrate an example procedure corresponding to Approach A, which covers MEC-WTRU, WTRU-MEC, WTRU-WTRU and MEC-MEC relocations. This example may address both the first and second key issues.

Figure 5A:
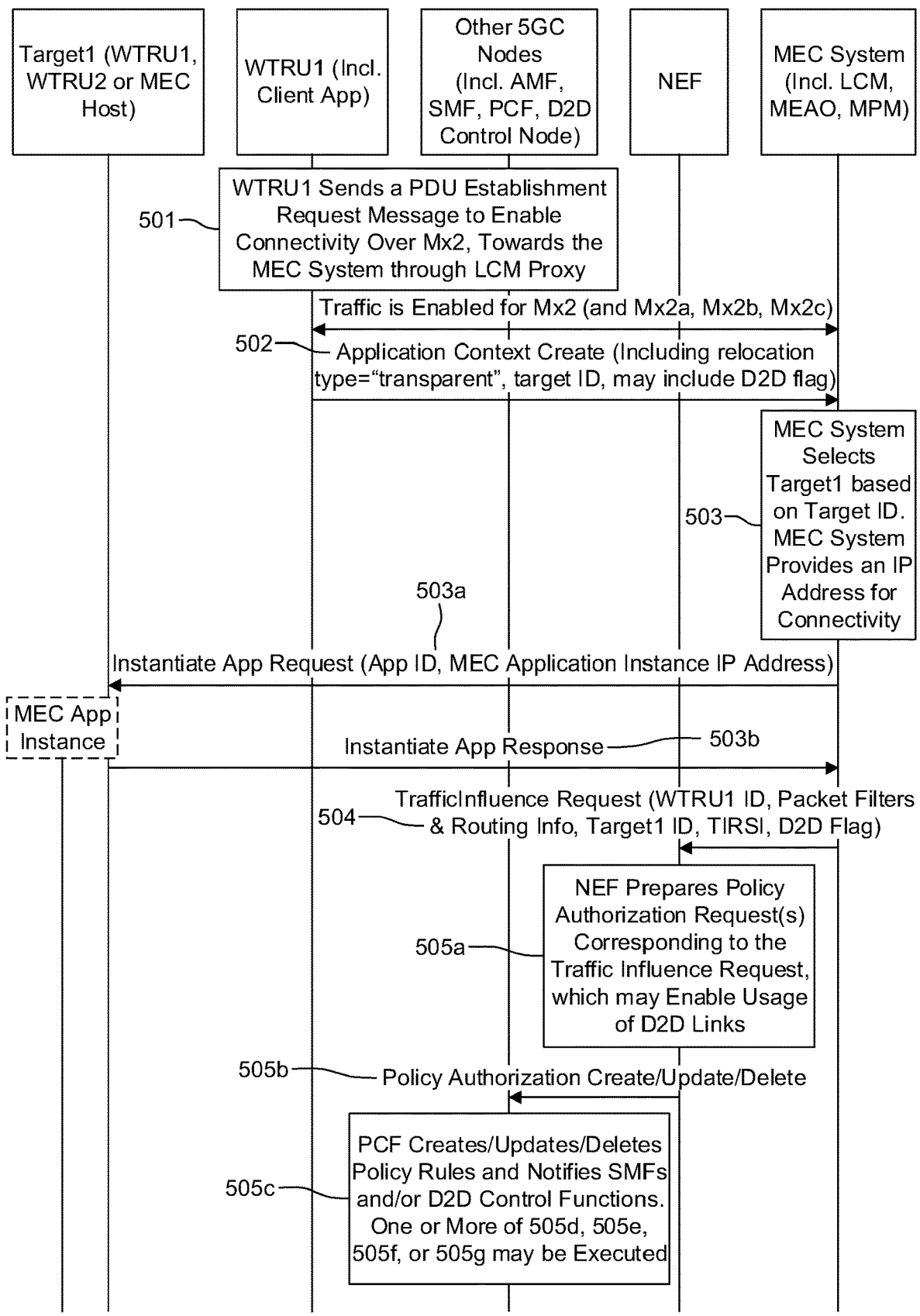
FIG. 5A is a procedure diagram illustrating an example procedure for enabling transparent relocation of an MEC application instance.

At 501 of FIG. 5A, WTRU1 may send a PDU establishment request message to enable connectivity over Mx2, towards the MEC system through LCM proxy, and the 5GS may establish the PDU session.

At 502 WTRU1 may send, to an MEAO, a request to create of an application context. The request may specify a target ID (e.g., a generic designation or a specific WTRU or MEC host ID) and relocation type (e.g., "transparent"). The request may also include a D2D flag, to indicate that D2D may be used between client and MEC application instance. A target ID values may include numerical codes corresponding to generic designations such as "any MEC host", "client WTRU", "Nearby WTRU", or "Any." Alternatively, or additionally, the target ID values may include a specific MEC host ID, a specific WTRU ID, specific DNAI, specific MEC site ID, etc. While the message flow shown in FIG. 5 may assume a value "transparent," it should be appreciated that relocation type values may include numerical codes corresponding to "transparent" or "application assisted."

During 502, and any other use of the enhanced application context create message or application relocation request message described herein, the target ID may be obtained by the WTRU using an algorithm such as those disclosed herein (e.g., such as the use cases disclosed herein). For example, a WTRU may decide to use "any MEC host" to save battery power in a specific situation or may decide to use "client WTRU" to achieve a shorter latency. For example, a WTRU may detect neighboring WTRUs and collect their IDs where in one example may be 5G Generic Public Subscription Identifiers, using a discovery protocol, and then decide to use them to as target ID. In another example, a WTRU may obtain DN access identifiers (DNAI) of nearby MEC sites, possibly associated with characteristics such as a level of security/trust, cost, or the like. The WTRU may use these characteristics to select one or more DNAI to use as target ID.

At 503 the MEC system may select an effective target MEC host/WTRU (herein referred to as "target1") based on the value of target ID from 502 and trigger the creation of an MEC application instance on a virtual infrastructure of target1 (e.g., using Mx2a/Mx2b/Mx2c interfaces when the target is a WTRU). The MEC system may use APIs exposed by the 5GS to locate and get information on potential targets. For example, the MEC system may use APIs (e.g., exposed by an NEF or PCF) to list WTRUs near the client WTRU (e.g., if the target ID is "nearby WTRU"), and/or obtain battery status and current CPU/memory usage. The MEC system may run an algorithm based on MEC operator policy to perform the actual selection.

At 503a, the MEC systems may send an Instantiate App Request message to target1.

At 503b, target1 may instantiate the MEC App instance and send an Instantiate App Response message back.

At 504, the MEC system may send an enhanced traffic influence service request to the NEF for setting up connectivity between a WTRU1 client application instance and the MEC application instance on target. In addition to existing information element such as a WTRU ID, packet filters and routing information), an enhanced service request may also include a target1 ID, TIRSI, and/or may include a D2D flag. In cases where the MEC application instance is on a WTRU, a target ID (e.g., ID of the target WTRU) may be present, for example, in replacement of the DNN, which is sometimes used to indicate to the DN where the MEC application instance is located. TIRSI may be provided to enable 5GS nodes (e.g., NEF, UDR, PCF, SMF) to store it and later use it to retrieve previous parameters (e.g., rules, PDU contexts, etc.) related to a relocated session. If present, the D2D flag may indicate that when possible (e.g., when MEC application instance is running on a WTRU different from the client WTRU), a D2D link may or must be used for communication between client application and MEC application instance.

The NEF may trigger the establishment of connectivity from WTRU to MEC application instance, by communicating with 5GS or target WTRU/MEC host. As shown at 505a, the NEF may prepare one or more policy authorization requests corresponding to the traffic influence request to set up connectivity between the client on WTRU1 and the MEC application instance on target1. If a D2D flag is present and the target is WTRU2, the policy authorization request(s) may include an indication to use a D2D link. The NEF may store the TIRSI associated with the target WTRU/MEC host ID (e.g., to later retrieve target1 ID when a relocation is requested).

At 505b, the NEF may communicate with other nodes (e.g., a Bootstrapping Server Function, BSF) to identify the PCF. The NEF may send one or more Policy Authorization Create/Update/Delete messages to the PCF.

At 505c, the PCF may create, update, or delete policy rules (e.g., WTRU or UE Route Selection Policy (URSP)) and may notify an SMF or D2D control function (e.g., a ProSe or V2X control function), as applicable, based on the one or more Create/Update/Delete messages received from the NEF, for instance. The PCF may store TIRSI in association with rules (e.g., to later retrieve rules associated with a given TIRSI). One or more of 505d, 505e, 505f, and/or 505g may be executed after 505c.

Figure 5B:
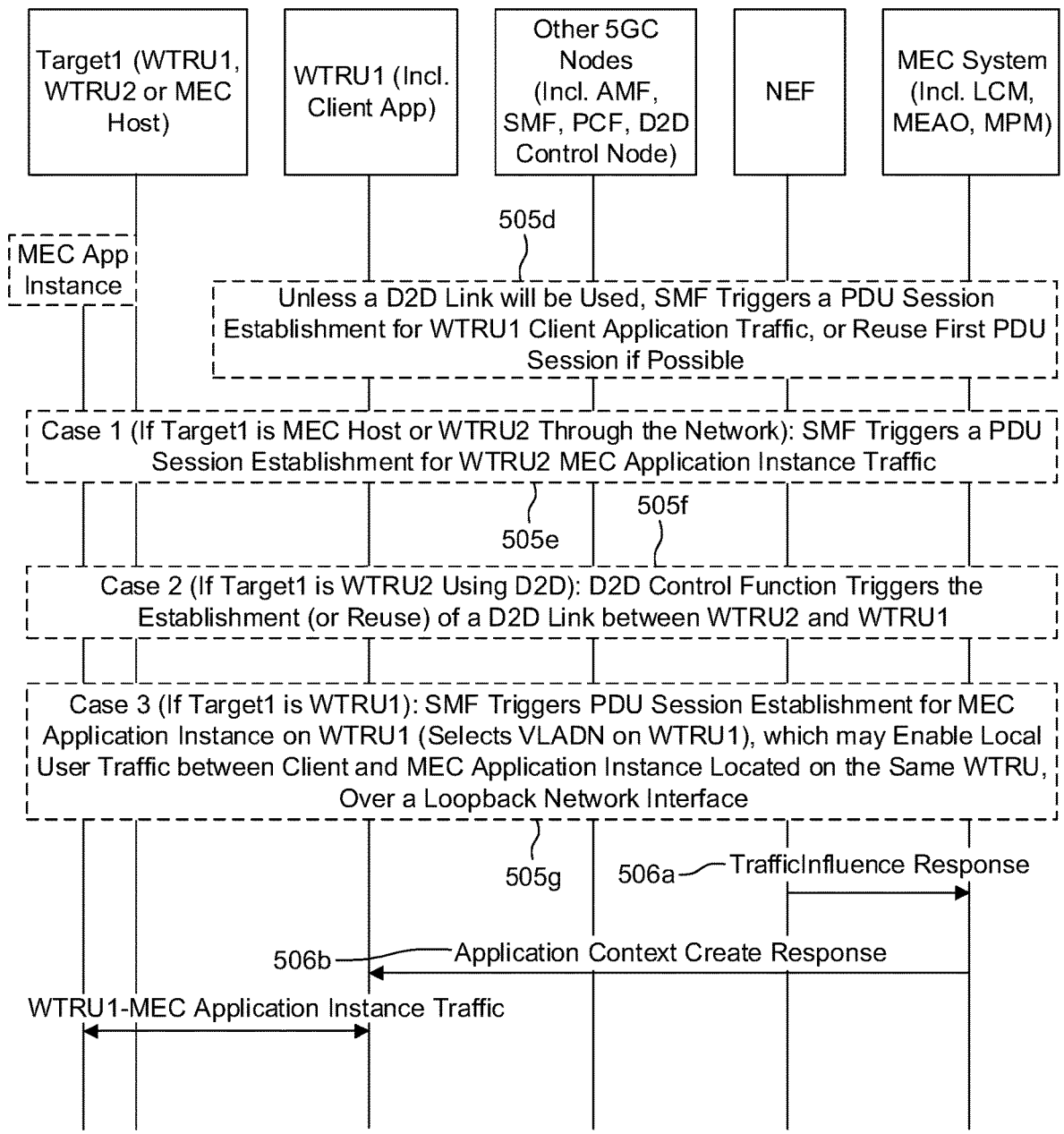
FIG. 5B is a procedure diagram further illustrating an example procedure for transparent relocation of an MEC application instance.

As shown in FIG. 5B, At 505d, if D2D is not used, the SMF may, based on one of the policy rules from 505c that relates to WTRU1 connectivity, create a PDU session for the client application. The SMF may enable an efficient connection to target1 (e.g., by selecting UPF(s) to enable a low latency connection to target1). The SMF may store TIRSI in association with PDU session context for future use (e.g., to later retrieve PDU session context associated with a given TIRSI).

At 505e, there may be another policy that relates to target1 connectivity. If target1 is a MEC host or WTRU2 not using D2D, the SMF may use a new policy rule from 505c to create a PDU session for the MEC application instance. The SMF may enable an efficient connection to WTRU1 (e.g., by selecting UPF(s) to enable a low latency connection to WTRU1). The SMF may store TIRSI in association with PDU session context for future use (e.g., to later retrieve PDU session context associated with a given TIRSI).

At 505f, if target1 is a WTRU2 using D2D, the D2D control function may trigger the creation or reuse of a D2D link between WTRU2 and WTRU1, and requests client-MEC application instance user traffic to be routed over the D2D link. The D2D control function, WTRU1 and/or WTRU2 may store TIRSI in association with the D2D link (e.g., to later retrieve D2D link associated with a given TIRSI).

At 505g, if target1 is WTRU1, the SMF may use a policy rule from 505c (e.g., including V-DN as data network) to create a PDU session for the MEC application instance on WTRU1. To establish the PDU session, the SMF may select and configure the virtual UPF on WTRU1 to enable local user traffic between client and MEC application instance located on the same WTRU over a loopback network interface. WTRU1 may store TIRSI associated with traffic forwarding rules for future use (e.g., to later retrieve forwarding rules associated with a given TIRSI).

At 506a, the NEF may send a TrafficInfluence response message to the MEC system. At 506b, the MEC system may send an Application Context Create Response message to WTRU1. At this point, connectivity may be established between the client application and a first MEC application instance.

Figure 5C:
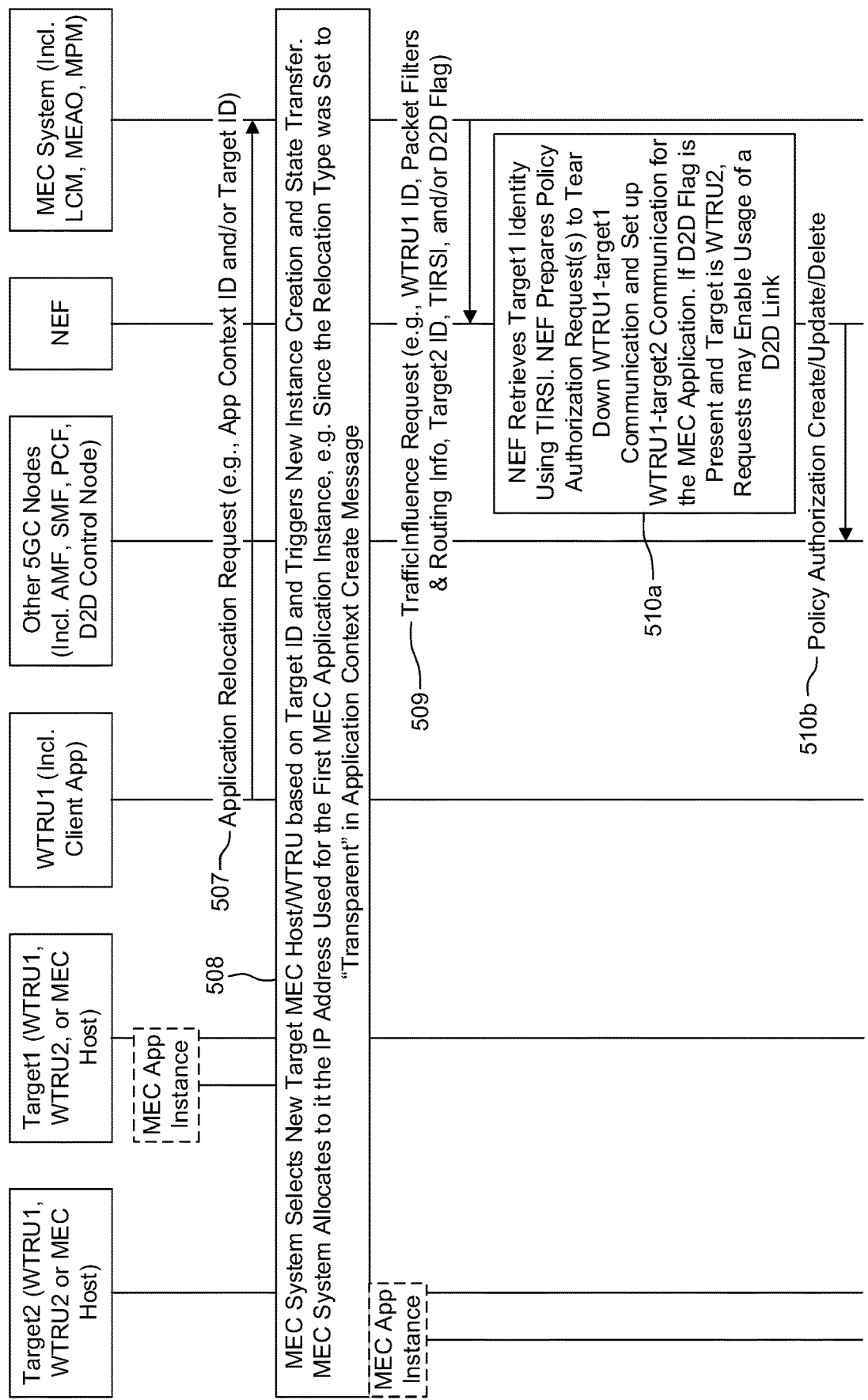
FIG. 5C is a procedure diagram further illustrating an example procedure for transparent relocation of an MEC application instance.

In FIG. 5C, at 507, the WTRU1 may send an application relocation request to MEC system (e.g., to improve communication latency following movement of WTRU1). This request may include an application context ID that matches the initial request at 502. In some cases, the application context ID may be a known ID that is created when the application context create message is processed, and is known by both the MEC system and WTRU for later reference to this application context. This request may include a second target ID with a value among those described above with respect to 502, but in some cases different from the target ID provided at 502. For example, in 502 the target ID may be "any MEC host" and in 507 the target ID may be "client WTRU". Alternatively, MEAO may decide to relocate the MEC application instance (e.g., based on monitoring of WTRU1's location).

At 508 the MEC system may select an effective target MEC host/UE (hereafter referred to as "target2") based on the value of target ID from 507. The MEC system may trigger the creation of a new suitably located second MEC application instance on target2 (e.g., on a MEC host collocated with the new point of attachment of WTRU1, or on WTRU1 itself). The application state from the first MEC application instance may be transferred to the second MEC application instance. For example, to transfer the application state, the MEC system may pause the first MEC application instance, obtain its state through the MEC platform, and send an Instantiate Application Request to the target WTRU or MEC platform, that includes the application state. The MEC system may allocate to it the IP address used for the first MEC application instance, since the relocation type was set to "transparent" in application context create message. For example, the IP address may be provided in the instantiate application request message sent by MEC system to target2).

At 509, the MEC system may send a traffic influence request to NEF, including, for example, the WTRU1 ID, packet filters and routing info, target2 ID, TIRSI, and if applicable, a D2D flag.

The NEF may trigger the seamless transfer of connectivity from first MEC application instance to second MEC application instance. As shown in FIG. 5B, at 510a, the NEF may retrieve the target1 identity using TIRSI. The NEF may prepare one or more policy authorization requests to release WTRU1-target1 communication and set up WTRU1-target2 communication for the MEC application. If a D2D flag is present and target2 is WTRU2, the one or more policy authorization requests may include an indication to use a D2D link.

At 510b, the NEF may send Policy Authorization Create/Update/Delete messages to the PCF.

Figure 5D:
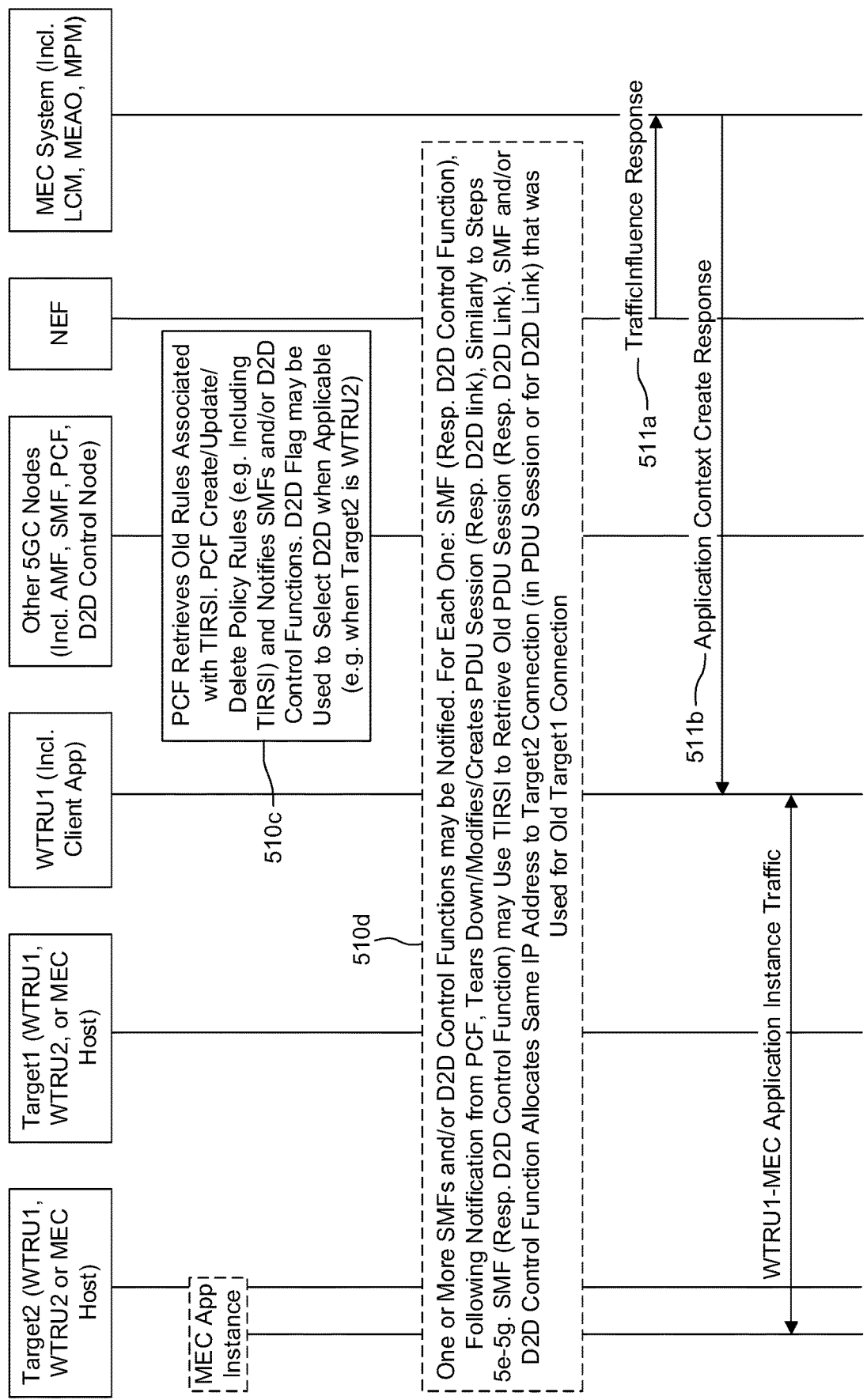
FIG. 5D is a procedure diagram further illustrating an example procedure for transparent relocation of an MEC application instance.

As shown in FIG. 5D, at 510c the PCF may retrieve old rules associated with TIRSI. The PCF may create, update, and/or delete policy rules and notify SMFs and/or D2D control functions (e.g. ProSe or V2X control function). The PCF may store TIRSI in association with rules (e.g., in policy rules). The D2D flag may be used to select the D2D when applicable (e.g., when target2 is WTRU2). Policy rules may also include an "indication of application IP address preservation". Presence of this indication can lead the SMF to retrieve the TIRSI from the policy rule and search for an old PDU session already associated with this TIRSI.

At 510d, one or more SMFs and/or D2D control functions may be notified. For each one, the SMF or a D2D control function, following notification from PCF, may release, modify, and/or create a PDU session (or D2D link). These steps may be performed similarly to steps 505e through 505g. The SMF or D2D control function may use TIRSI to retrieve an old PDU session e.g., or D2D link that need to be updated or released. The SMF and/or D2D control function may allocate the same IP address to target2 connection (e.g., in PDU session or for D2D link) that was used for the old target1 connection.

At 511a, the NEF may send a TrafficInfluence response message to MEC system. At 511b, the MEC system may send an Application Context Create Response message to WTRU1. At this point, connectivity may be established between a client application and a second MEC application instance.

In FIG. 5A and FIG. 5B, for simplicity's sake, cases where MEC system communicates with NEF and NEF communicates directly with PCF are shown. In embodiments not shown, the MEC system may be allowed by the 5G network operator to directly interact with 5GS nodes such as PCF instead. In some embodiments, instead of communicating directly with PCF, the NEF may communicate indirectly with PCF through UDR.

FIGS. 6A, 6B, 6C, and FIG. 6D illustrate a procedure corresponding to Approach B, which may cover MEC-WTRU, WTRU-MEC, WTRU-WTRU, and MEC-MEC relocations.

Figure 6A:
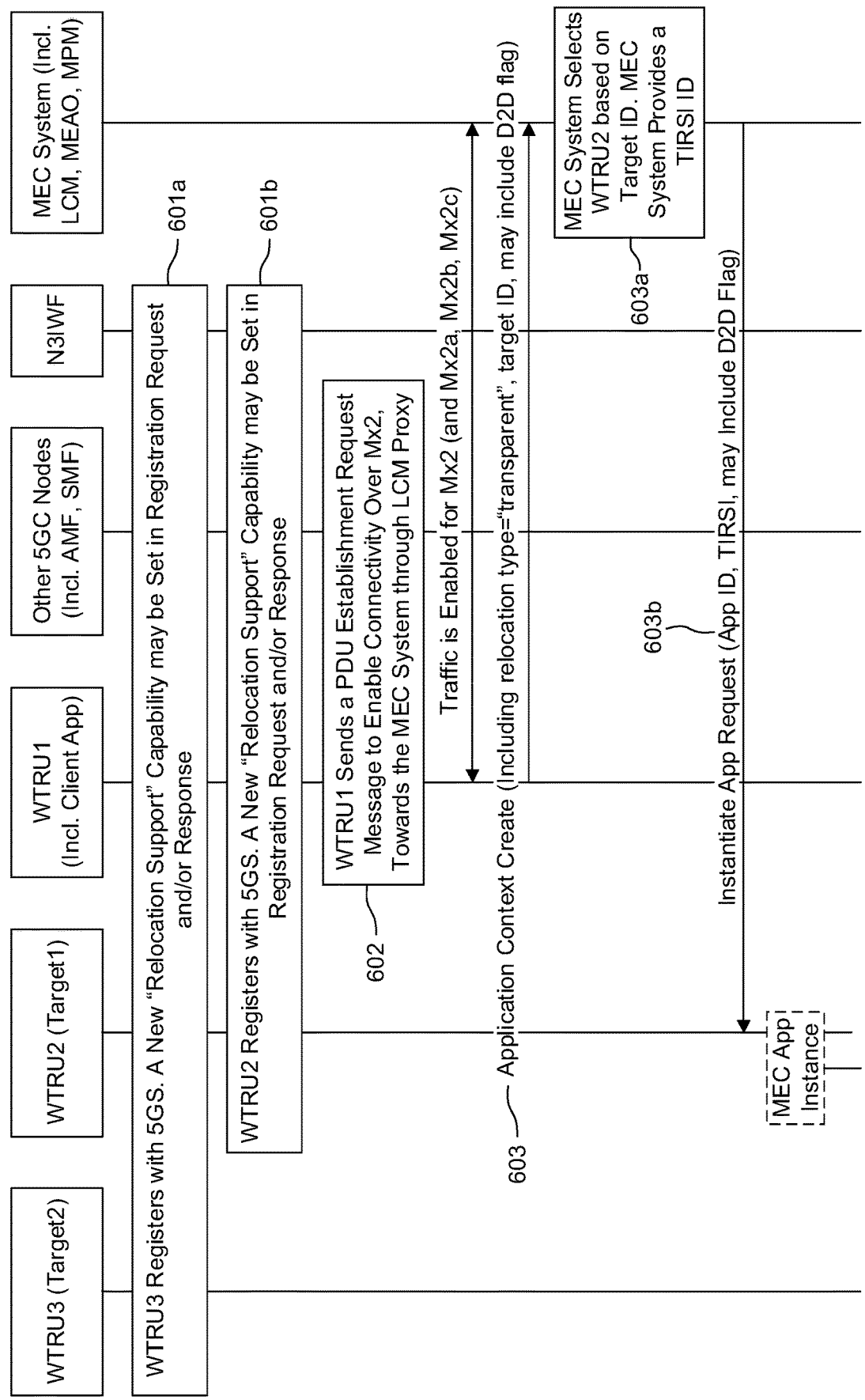
FIG. 6A is a procedure diagram illustrating examples of MEC-WTRU, WTRU-MEC, WTRU-WTRU and MEC-MEC application instance relocation.

In FIG. 6A, at 601a and 601b, WTRU2 and WTRU3, any of which may be a MEC host located in a local area data network or a WTRU enhanced for an on-WTRU MEC as described with respect to FIG. 4 and related embodiments, may register with 5GS (e.g., through N3IWF if WTRU2 is a MEC host, or over N1 in other cases). A "relocation support" capability may be set in registration request and/or response. When present in the request or response, this capability informs the 5GS and/or WTRU that the WTRU or 5GS supports transparent relocation of MEC application instances as described herein. For example, it may set or accept TIRSI in PDU session establishment requests.

At 602 the WTRU1 may send a PDU establishment request message to enable connectivity over Mx2, towards the MEC system through LCM proxy. The 5GS may establish the PDU session.

The WTRU1 may send to the MEC system an Application Context Create request including a target ID (e.g., a generic designation or a specific WTRU ID) information element. To support future relocation, a relocation type (e.g., "transparent") may be included. The request may also include a D2D flag, to indicate that D2D may be used between a client and MEC application instance. An example of target ID values may include generic designations code such as "any MEC host", "client WTRU", "Nearby WTRU", "Any", or a specific WTRU ID, specific DNAI, specific MEC site ID, or the like. Relocation type values may include "transparent" or "application assisted".

At 603a the MEC system may select an effective target WTRU (hereafter referred to as "WTRU2") based on the value of target ID. The MEC system may use APIs exposed by 5GS to locate and obtain information on potential targets, such as a list of WTRUs near the client WTRU (for example, if target ID is "nearby WTRU"), and/or obtain battery status and current CPU and/or memory usage. The MEC system may run an algorithm based on MEC operator policy to perform the actual selection.

At 603b the MEC system may trigger the creation of the MEC application instance on WTRU2 (i.e., through local and/or in-network MEAO and MEC platform components, depending on WTRU2's nature and location). To support future relocation, the MEC platform may provide a TIRSI ID to the MEC application instance. The MEC platform may also provide a D2D flag to indicate that D2D should be used for connectivity.

Upon creation of the MEC application instance (e.g., when the MEC application instance requests connectivity), the WTRU2 may initiate connectivity to WTRU1.

Figure 6B:
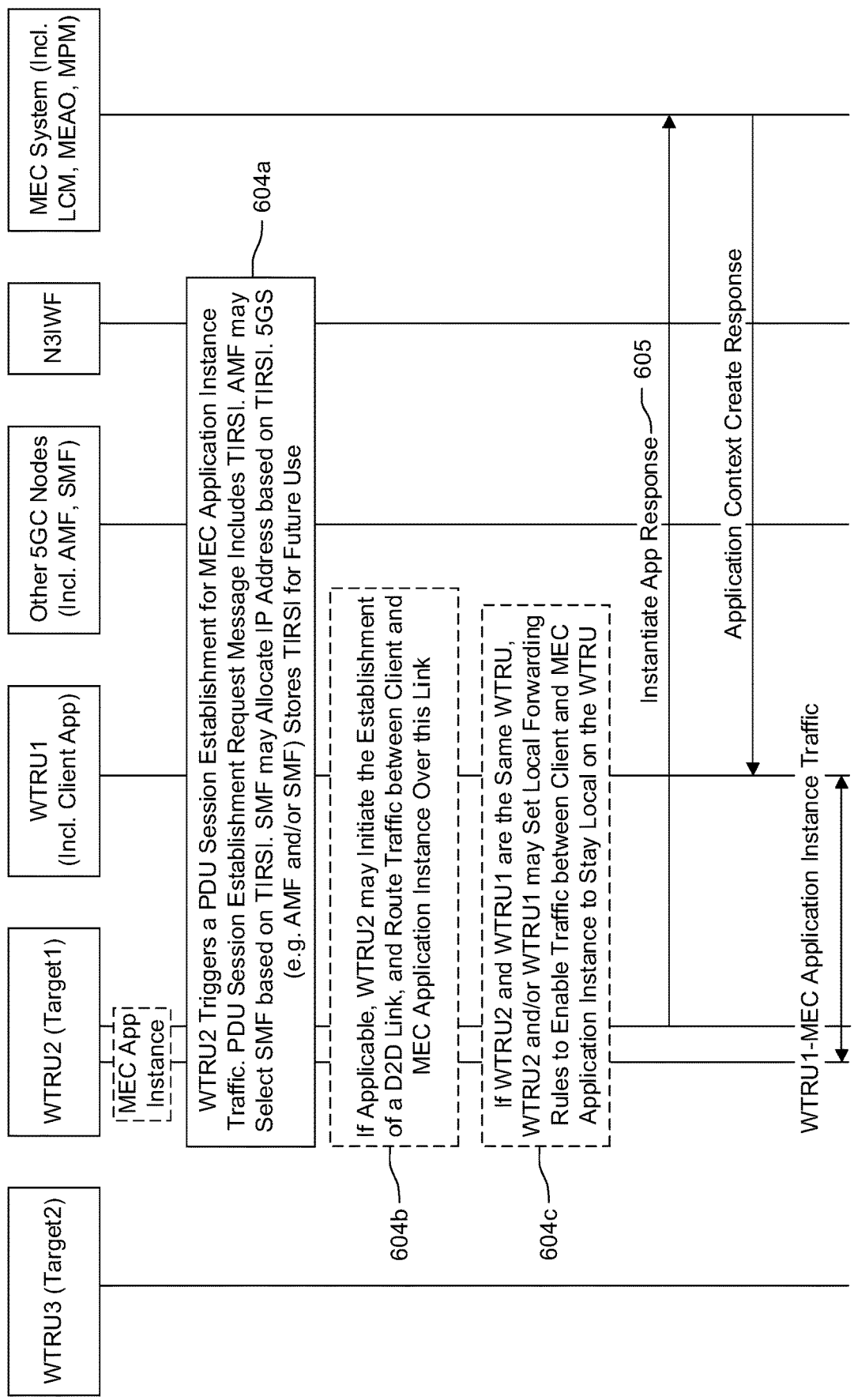
FIG. 6B is a procedure diagram further illustrating examples of MEC-WTRU, WTRU-MEC, WTRU-WTRU and MEC-MEC application instance relocation.

As shown in FIG. 6B, at 604a, the WTRU2 may send a PDU session establishment message to the 5GS. This may result in the 5GS establishing a new PDU session between WTRU2 and a PSA UPF. To support future relocation, the WTRU2 may send the TIRSI ID within a PDU establishment message, and/or the AMF may select SMF based on the TIRSI (e.g., AMF may select a relocation capable SMF). The SMF may allocate an IP address based on the TIRSI (e.g., SMF may allocate an IP address in a specific subnet used for all relocatable PDU sessions). The AMF and/or SMF may store the TIRSI ID for future use. If WTRU2 is a MEC host, then the WTRU2 may use the N1 interface through N3IWF to initiate the PDU session. The SMF may be enhanced to use DHCPv6 to allocate a specific IP address to the PDU session.

At 604b, if applicable, the WTRU2 may initiate the establishment of a D2D link, and route traffic between a client and MEC application instance over this link.

At 604c, if WTRU2 and WTRU1 are the same WTRU, WTRU2/and/or WTRU1 may set local forwarding rules to enable traffic between client and MEC application instances to stay local on the WTRU.

At 605 the WTRU2 may send a response message to the MEC system. The MEC system may send an Application Context Create Response message to WTRU1. At this point, connectivity may be established between client application on WTRU1 and a first MEC application instance on WTRU2.

Figure 6C:
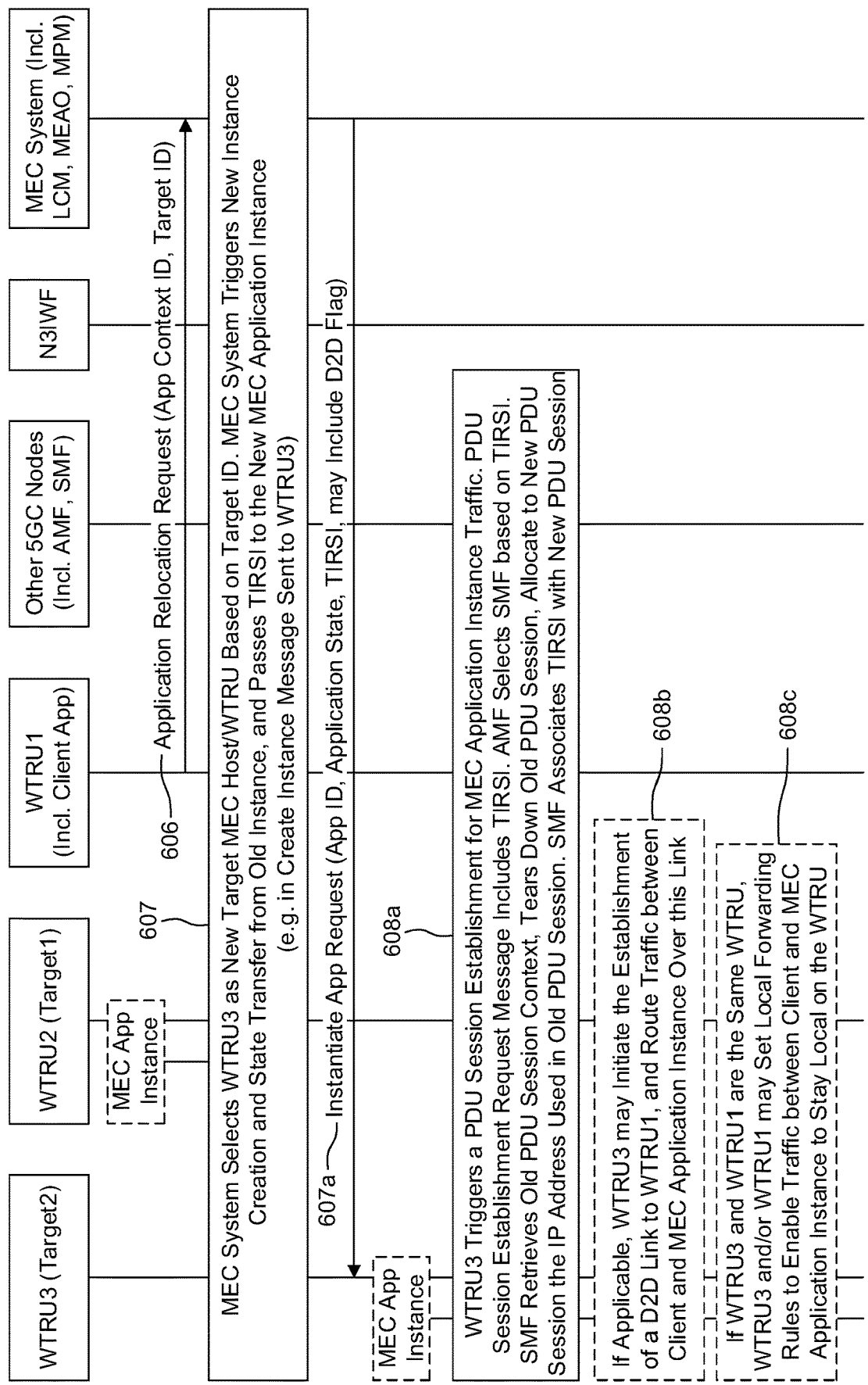
FIG. 6C is a procedure diagram further illustrating examples of MEC-WTRU, WTRU-MEC, WTRU-WTRU and MEC-MEC application instance relocation.

In FIG. 6C, at 606 the WTRU1 may request relocation of the MEC application instance (e.g., to improve communication latency following movement of WTRU1). This request may include a second target ID with a value among those described with respect to step 603, but typically different from the target ID provided at 603. Alternatively or additionally, the MEAO may decide to relocate the MEC application instance (e.g., based on monitoring of WTRU1's location).

At 607, the MEC system may select an effective target WTRU (hereafter referred to as "WTRU3") based on the value of a target ID from step 606. WTRU3 may be a MEC host located in a local area data network, or a WTRU enhanced for an on-WTRU MEC as described in FIG. 4. The MEC system may trigger the creation of a new suitably located second MEC application instance on WTRU3. The state from the first MEC application instance may be transferred to the second MEC application instance. In some embodiments, the first MEC application instance may be paused from this point on.

At 607a, as part of this process, the MEC system may send an Instantiate App Request message to WTRU3, which may include a TIRSI and/or a D2D flag.

At 608, upon creation of the MEC application instance (e.g., when MEC application instance requests connectivity), the WTRU3 may initiate connectivity to WTRU1.

At 608a, the WTRU3 may trigger a PDU session establishment for the MEC application instance traffic. A PDU session establishment request message may include the TIRSI. The AMF may select the SMF based on the TIRSI. The SMF may retrieve an old PDU session context, release the old PDU session, and/or allocate to the new PDU session the IP address that was used in the old PDU session. The SMF may associate the TIRSI with the new PDU session context.

At 608b, if applicable, WTRU3 may initiate the establishment of a D2D link to WTRU1, and route traffic between the client and MEC application instance over this link.

At 608c, if WTRU3 and WTRU1 are the same WTRU, WTRU3 and/or WTRU1 may set local forwarding rules to enable traffic between client and MEC application instance to stay local on the WTRU.

Figure 6D:
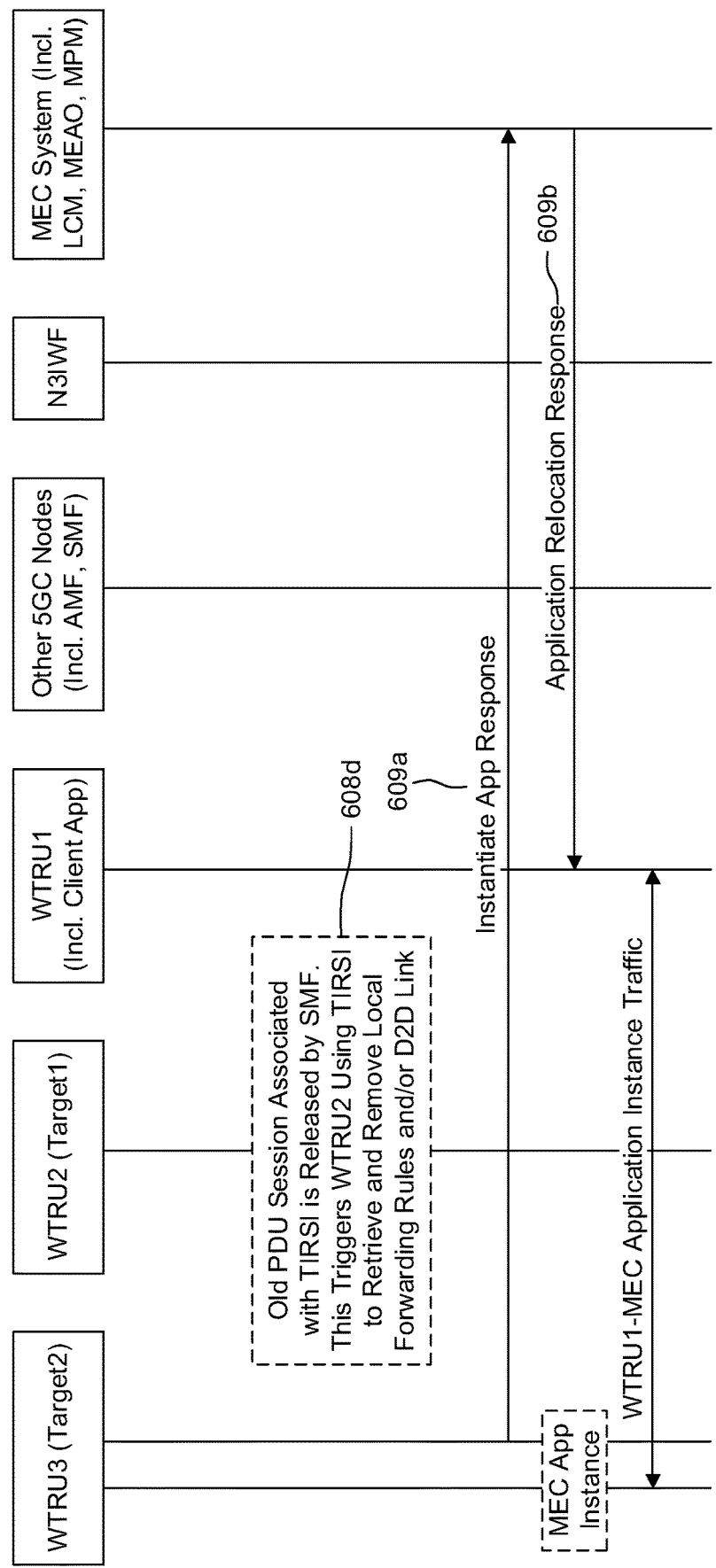
FIG. 6D is a procedure diagram further illustrating examples of MEC-WTRU, WTRU-MEC, WTRU-WTRU and MEC-MEC application instance relocation.

As shown in FIG. 6D, at 608d, when old the PDU session associated with a TIRSI is released, WTRU2 may use the TIRSI to retrieve and remove local forwarding rules and/or D2D link.

At 609, WTRU3 may send a response message to the MEC system. The MEC system may send an Application Context Create Response message to WTRU1. At this point, connectivity may be established between a client application on WTRU1 and a second MEC application instance on WTRU3.

FIG. 7 illustrates an example of PDU session establishment to a V-DN. In this example, there may be additional details on how client-MEC application instance connectivity is established when the MEC application instance is on the client WTRU, in a local virtual DN as described in FIG. 4. These details may be used, for example, in Approach A (i.e., when the MEC application instance is on the client WTRU) and shown in steps 505 and 510 of FIGS. 5A and 5B. These details may also be used in Approach B, for example, at steps 605c and 608c as shown in FIGS. 6A and 6B. While not illustrated in FIG. 7, as this example may focus on demonstrating V-DN and virtual UPFs, when these details are implemented in Approach A or Approach B, the TIRSI information element may be present in a PDU session establishment request.

At 701, the WTRU may decide to request a local PDU session for the client application, setting as DNN the name of local virtual DN.

At 702 the WTRU may send, to an AMF, a PDU session establishment request message, where the DNN field may be set to the name of the Virtual DN on the WTRU. This name may be known by the WTRU or configured at the WTRU. The name may use a scheme such as "<ue-id>.<mec-operator-domain>.local."

At 703, the AMF may select an SMF, at least in part, based on the fact that DNN is a virtual DN. For example, a single SMF may handle all connections to V-DNs corresponding to a given MEC operator.

At 704 the AMF may forward the PDU session establishment request within a CreateSMContext Request message sent to the SMF.

At 705 the SMF may retrieve subscription information for the WTRU. At 706 the SMF may send a CreateSMContext Request response.

At 707 an optional secondary authentication/authorization may take place. This may involve a DN-AAA server which is located in another DN than the V-DN. For example, the SMF may be configured with a DN-AAA server to use for all WTRUs requesting a V-DN related to a given MEC operator domain.

At 708, the SMF may select a PCF and establish or modify a policy association. The SMF may select UPF, which may be in some cases such as this, a virtual UPF on the WTRU).

At 709, the SMF may send a N4 session establishment or modification request to V-UPF. This message may be sent over an N11 interface to the AMF and then over an N1 interface to the WTRU. This message may include any IE used in N4 messages between the SMF and UPF. Such messages may include those used for packet detection, enforcement, and reporting rules to be installed on the virtual UPF. In some embodiments, the V-DN name may be present, which may help support cases where multiple V-DNs are present on the WTRU. This message may be a simplified version of the current N4 message. For example, QoS enforcement and marking rules may not be necessary over the loopback interface. In one or more embodiments, the message may be limited to only a few IEs, such as the packet detection rules and V-DN name.

At 710, the virtual UPF may set packet filtering and forwarding rules as per an SMF request. The virtual UPF may perform additional actions, depending on the content of the message of 709. For example, this may include counting and reporting traffic statistics, performing traffic forwarding or recording for legal traffic interception, and the like. At 711, the virtual UPF may send back a response to SMF over the same path as the request.

At 712, the SMF may send a PDU Session Establishment Accept message to the WTRU through the AMF. At this point, user plane traffic may be enabled between the client application and the local virtual UPF.

D2D link establishment in procedures for Approach A and Approach B may be performed through a D2D control function. In some embodiments, the WTRU may request a PDU session establishment, and then the SMF may request a virtual UPF to perform a D2D link establishment. The example described in FIG. 7 may be extended to cases where the virtual DN is on a different WTRU than the client application (e.g., client application is on WTRU1, and a virtual DN is on WTRU2). In such cases, the N4 message described with respect to 709 may reach a virtual UPF on WTRU1 or WTRU2. In 710, a virtual UPF on WTRU1 or WTRU2 may establish a D2D link to the other WTRU and set up the traffic rules to forward user plane traffic over this D2D link.

In some situations, the techniques described herein may be applied to cases where the MEC application is a pass-through application. In such cases, no IP address may need to be allocated to the MEC application instances for data plane traffic, and no IP address may need to be transferred. Besides this aspect, the procedures described herein may be applicable to pass-through MEC application instance relocation (e.g., TIRSI can still be used by 5GS to retrieve the old PDU session context during an MEC application instance relocation procedure).

Similarly, the techniques described herein may be applied to application-assisted instance relocation (e.g., applications that support a redirection mechanism based on HTTP, SIP, etc.). In such cases, there may be no need to reuse the same IP address for data plane traffic. The second MEC application instance may use a new IP address and let the application deal with redirection (e.g., first MEC application instance may redirect the client towards the second instance). Similarly, application session state transfer may be performed at the application layer (e.g., through the client). Besides these aspects, the procedures described herein are applicable to application-assisted MEC application instance relocation. For example, a TIRSI may still be used by 5GS to retrieve the old PDU session context during an MEC application instance relocation procedure).

The techniques described herein may be applied to support cases where the MEC application is stateless. In this case, the application state transfer related messages may be omitted, and no application state may need to be provided in create application instance messages. Additionally, the techniques described herein may be combined to support different types of applications, such as stateless pass-through applications.

While the techniques disclosed herein may discuss one logical SMF, multiple physical SMFs may be involved. SMFs may store session management subscription data in a Unified Data Management network function (UDM). For a 5G system, an SMF may retrieve session management subscription data associated with a given WTRU, for example, by using the WTRU's Subscription Permanent Identifier (SUPI) as a key as follows: "GET . . . /{supi}/sm-data".

To support the mechanism described herein, a UDM may provide an API to retrieve a session context using TIRSI. For example, SMF may send a "GET . . . /sm-data" query along with a new query parameter "tirsi=<value>". The UDM may maintain a list of TIRSI-associated PDU sessions in its internal state, or in a table stored in UDR, that the UDM uses (possibly with UDR support) to search for a PDU session matching the value of the new query parameter. The UDM may then return the corresponding session management subscription data to the SMF, therefore enabling MEC application instance relocation across multiple-SMFs.

An in-network entity, such as a MEAO, may decide to relocate an application instance from a WTRU/MEC host to another WTRU/MEC host. For example, a MEAO may receive a notification that a client WTRU has changed its attachment point and decide based on the new attachment point location to relocate an application instance serving this WTRU, such as to an application server collocated with the new attachment point. Therefore, relocation procedures described herein may be triggered by MEAO without an Mx2 message from a WTRU.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method for transparent relocatable application deployment performed by a client wireless transmit/receive unit (WTRU), the method comprising:
   transmitting a first message including: information indicating a request to deploy a relocatable application instance, information indicating that the client WTRU supports relocation of application instances, and information designating one or more target devices;
   receiving a second message including information indicating to establish communication with an application instance on one of the one or more target devices;
   initiating, in response to the second message, communication with the one of the one or more target devices via the application instance;
   transmitting a third message including information indicating a request to relocate the application instance;
   receiving a fourth message including information indicating to establish communication with the relocated application instance and configuration information for forwarding data to the relocated application instance, wherein the relocated application instance is deployed locally at the client WTRU; and
   receiving a fifth message including user traffic data to be forwarded, based on the received configuration information, to the relocated application instance.
2. The method of claim 1, wherein the fourth message is received from a core network via a radio access network (RAN).

3. The method of claim 1, wherein the information designating the one or more target devices is one of:
- an identifier associated with a single device; or
- a generic designation associated with one or more devices.

4. The method of claim 1 further comprising receiving a message including information indicating to deploy the application instance locally at the client WTRU.

5. The method of claim 1, wherein the one or more target devices include the client WTRU.

6. The method of claim 1, wherein the fifth message including user traffic data to be forwarded to the relocated application instance is included in a transmission received from another device.

7. The method of claim 1, wherein the fifth message including user traffic data to be forwarded to the relocated application instance is received from a local client application operating at the client WTRU.

8. The method of claim 1, wherein communication with the application instance and communication with the relocated application instance are initiated using different Internet Protocol (IP) addresses.

9. The method of claim 1, wherein communication with the application instance and communication with the relocated application instance are initiated using a same Internet Protocol (IP) address that is associated with a relocatable session.

10. The method of claim 9, wherein the IP address that is associated with the relocatable session is a transparent instance relocation session identifier (TIRSI).

11. A client wireless transmit/receive unit (WTRU) configured to deploy a transparent relocatable application, the client WTRU comprising:
- a transmitter configured to transmit a first message including: information indicating a request to deploy a relocatable application instance, information indicating that the client WTRU supports relocation of application instances, and information designating one or more target devices;
- a receiver configured to receive a second message including information indicating to establish communication with an application instance on one of the one or more target devices;
- the transmitter configured to, in response to the second message, communicate with the one of the one or more target devices via the application instance;
- the transmitter configured to transmit a third message including information indicating a request to relocate the application instance;
- the receiver configured to receive a fourth message including information indicating to establish communication with the relocated application instance and configuration information for forwarding data to the relocated application instance, wherein the relocated application instance is deployed locally at the client WTRU; and
- the receiver configured to receive a fifth message including user traffic data to be forwarded, based on the received configuration information, to the relocated application instance.

12. The client WTRU of claim 11, the receiver configured to receive the fourth message from a core network via a radio access network (RAN).

13. The client WTRU of claim 11, wherein the information designating the one or more target devices is one of:
- an identifier associated with a single device; or
- a generic designation associated with one or more devices.

14. The client WTRU of claim 11, the receiver configured to receive a message including information indicating to deploy the application instance locally at the client WTRU.

15. The client WTRU of claim 11, wherein the one or more target devices include the client WTRU.

16. The client WTRU of claim 11, wherein the fifth message including user traffic data to be forwarded to the relocated application instance is included in a transmission received from another device.

17. The client WTRU of claim 11, wherein the fifth message including user traffic data to be forwarded to the relocated application instance is received from a local client application operating at the client WTRU.

18. The client WTRU of claim 11, wherein communication with the application instance and communication with the relocated application instance are initiated using different Internet Protocol (IP) addresses.

19. The client WTRU of claim 11, wherein communication with the application instance and communication with the relocated application instance are initiated using a same Internet Protocol (IP) address that is associated with a relocatable session.

20. The client WTRU of claim 19, wherein the IP address that is associated with the relocatable session is a transparent instance relocation session identifier (TIRSI).

* * * * *